(12) United States Patent
Thuillier et al.

(10) Patent No.: US 11,205,443 B2
(45) Date of Patent: Dec. 21, 2021

(54) SYSTEMS, METHODS, AND COMPUTER-READABLE MEDIA FOR IMPROVED AUDIO FEATURE DISCOVERY USING A NEURAL NETWORK

(71) Applicant: Microsoft Technology Licensing, LLC, Redmond, WA (US)

(72) Inventors: Etienne Thuillier, Helsinki (FI); Hannes Gamper, Seattle, WA (US); Ivan Jelev Tashev, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 340 days.

(21) Appl. No.: 16/047,058

(22) Filed: Jul. 27, 2018

(65) Prior Publication Data

US 2020/0035259 A1    Jan. 30, 2020

(51) Int. Cl.
| | | |
|---|---|---|
| *G10L 25/00* | (2013.01) | |
| *G10L 25/51* | (2013.01) | |
| *G10L 25/30* | (2013.01) | |
| *G06N 3/04* | (2006.01) | |
| *G06N 3/08* | (2006.01) | |
| *G10L 15/16* | (2006.01) | |
| *G10L 25/27* | (2013.01) | |

(52) U.S. Cl.
CPC .............. *G10L 25/51* (2013.01); *G06N 3/04* (2013.01); *G06N 3/08* (2013.01); *G10L 25/30* (2013.01); *G10L 15/16* (2013.01); *G10L 25/27* (2013.01)

(58) Field of Classification Search
CPC combination set(s) only.
See application file for complete search history.

(56) References Cited

U.S. PATENT DOCUMENTS

| | | |
|---|---|---|
| 4,325,381 A | 4/1982 | Glenn |
| 6,996,244 B1 | 2/2006 | Slaney et al. |
| 7,234,812 B2 | 6/2007 | Piorkowski et al. |
| 8,014,532 B2 | 9/2011 | Bruno et al. |
| 8,270,616 B2 | 9/2012 | Slamka et al. |
| 8,767,968 B2 | 7/2014 | Flaks et al. |

(Continued)

FOREIGN PATENT DOCUMENTS

| | | |
|---|---|---|
| EP | 2611216 A1 | 7/2013 |
| WO | 2013111038 A1 | 8/2013 |

OTHER PUBLICATIONS

"Non Final Office Action Issued in U.S. Appl. No. 15/876,644", dated Sep. 17, 2018, 13 Pages.

(Continued)

*Primary Examiner* — Vu B Hang
(74) *Attorney, Agent, or Firm* — Faegre Drinker Biddle & Reath LLP

(57) ABSTRACT

Systems, methods, and computer-readable storage devices are disclosed for improved audio feature discovery using a neural network. One method including: receiving a trained neural network model, the trained neural network configured to output an audio feature classification of audio data; deconstructing the trained neural network model to generate at least one saliency map, the at least one saliency map providing a successful classification of the audio feature; and extracting at least one visualization of the audio feature the trained neural network model relies on for classification based on the at least one saliency map.

20 Claims, 10 Drawing Sheets

(56) References Cited

U.S. PATENT DOCUMENTS

| | | | |
|---|---|---|---|
| 8,787,584 | B2 | 7/2014 | Nystrom et al. |
| 9,236,024 | B2 | 1/2016 | Coon |
| 9,544,706 | B1 | 1/2017 | Hirst |
| 9,615,190 | B1 | 4/2017 | Norris et al. |
| 9,900,722 | B2 | 2/2018 | Bilinski et al. |
| 9,934,590 | B1 | 4/2018 | Cheng |
| 9,967,693 | B1* | 5/2018 | Seamans .............. G06N 3/049 |
| 10,028,070 | B1 | 7/2018 | Gamper et al. |
| 10,418,957 | B1* | 9/2019 | Wang ..................... G10L 25/51 |
| 2003/0138107 | A1 | 7/2003 | Jin et al. |
| 2005/0047647 | A1* | 3/2005 | Rutishauser ......... G06K 9/4628 |
| | | | 382/159 |
| 2007/0183603 | A1 | 8/2007 | Jin et al. |
| 2009/0046864 | A1 | 2/2009 | Mahabub et al. |
| 2009/0171671 | A1* | 7/2009 | Seo ........................ G10L 25/69 |
| | | | 704/500 |
| 2009/0238371 | A1 | 9/2009 | Rumsey et al. |
| 2010/0111370 | A1 | 5/2010 | Black et al. |
| 2012/0183161 | A1 | 7/2012 | Agevik et al. |
| 2012/0237041 | A1 | 9/2012 | Pohle |
| 2012/0328107 | A1 | 12/2012 | Nystrom et al. |
| 2013/0169779 | A1 | 7/2013 | Pedersen |
| 2013/0194107 | A1 | 8/2013 | Nagata |
| 2014/0355765 | A1 | 12/2014 | Kulavik et al. |
| 2015/0055937 | A1 | 2/2015 | Van hoff et al. |
| 2015/0156599 | A1 | 6/2015 | Romigh |
| 2015/0257682 | A1 | 9/2015 | Hansen et al. |
| 2015/0312694 | A1 | 10/2015 | Bilinski et al. |
| 2016/0253675 | A1 | 9/2016 | Remillet |
| 2017/0208413 | A1 | 7/2017 | Bilinski et al. |
| 2017/0332186 | A1 | 11/2017 | Riggs et al. |
| 2018/0024362 | A1* | 1/2018 | Williamson ............. G01S 5/12 |
| | | | 345/428 |
| 2018/0146318 | A1 | 5/2018 | Bilinski et al. |
| 2018/0268737 | A1* | 9/2018 | Garnavi ................ G06F 19/321 |
| 2018/0270603 | A1 | 9/2018 | Gamper et al. |
| 2018/0350351 | A1* | 12/2018 | Kopys ..................... G10L 15/02 |
| 2019/0303748 | A1* | 10/2019 | Hah ......................... H01J 43/30 |
| 2019/0325860 | A1* | 10/2019 | Faubel ................... G10L 21/038 |

OTHER PUBLICATIONS

Gamper, et al., "Interaural Time Delay Personalisation Using Incomplete Head Scans", In Proceedings of the International Conference on Acoustics, Speech and Signal Processing, Mar. 5, 2017, pp. 461-465.

Wightman, et al., "Factors Affecting the Relative Salience of Sound Localization Cues", In Book of Binaural and Spatial Hearing in Real and Virtual Environments, Jan. 1997, pp. 1-23.

"AES Standard for File Exchange-Spatial Acoustic Data File Format", Published by Audio Engineering Society Inc., Jan. 2015, 5 Pages.

"HRTF Personalization Based on Artificial Neural Network in Individual Virtual Auditory Space", In the Proceedings of the Journal of Applied Acoustics, vol. 69, Issue 2, Feb. 2008, pp. 163-172.

"Acoustics-Normal Equal-Loudness-Level Contours", Published by International Standard, Reference No. ISO226:2003(E), Aug. 15, 2003, 7 Pages.

"Kinect for Xbox 360", Retrieved from: <<https://web.archive.org/web/20141216195730/http://www.xbox.com/en-US/xbox-360/accessories/kinect>>, Jul. 9, 2018, 1 Page.

"Making Immersive Virtual Reality Possible in Mobile", Retrieved from: <<https://www.qualcomm.com/documents/making-immersive-virtual-reality-possible-mobile>>, Apr. 2016, 51 Pages.

"Non-Negative Matrix Factorization", Retrieved from: <<https://en.wikipedia.org/wiki/Non-negative_matrix_factorization>>, Mar. 26, 2014, 11 Pages.

"SOFA General Purpose Database", Retrieved from: <<https://web.archive.org/web/20170617145713/https://www.sofaconventions.org/mediawiki/index.php/Files>>, Oct. 25, 2017, 2 Pages.

"Final Office Action Issued in U.S. Appl. No. 14/265,154", dated Apr. 7, 2017, 19 Pages.

"Non Final Office Action Issued in U.S. Appl. No. 14/265,154", dated Sep. 9, 2016, 18 Pages.

"Non Final Office Action Issued in U.S. Appl. No. 14/265,154", dated Feb. 1, 2016, 22 Pages.

Harma, et al., "Personalization of Headphone Spatialization Based on the Relative Localization Error in an Auditory Gaming Interface", In Proceedings of 132 Convention on Audio Engineering Society, Apr. 26, 2012, 8 Pages.

"Final Office Action Issued in U.S. Appl. No. 15/463,853", dated Apr. 30, 2018, 15 Pages.

"Non Final Office Action Issued in U.S. Appl. No. 15/463,853", dated Dec. 12, 2017, 11 Pages.

"Non Final Office Action Issued in U.S. Appl. No. 15/473,959", dated Feb. 27, 2018, 6 Pages.

Aaronson, et al., "Testing, Correcting, and Extending the Woodworth Model for Interaural Time Difference", In the Journal of the Acoustical Society of America, vol. 135, Issue 2, Feb. 2014, 8 Pages.

Abramowitz, et al., "Handbook of Mathematical Functions with Formulas, Graphs, and Mathematical Tables", In Publication of Courier Corporation, vol. 55, Jun. 1964, 22 Pages.

Ahrens, et al., "HRTF Magnitude Modeling Using a Non-Regularized Least-Squares Fit of Spherical Harmonics Coefficients on Incomplete Data", In Proceedings of Asia-Pacific Signal and Information Processing Association Annual Summit and Conference, Dec. 3, 2012, 5 Pages.

Algazi, et al., "Approximating the Head-Related Transfer Function Using Simple Geometric Models of the Head and Torso", In Journal of the Acoustical Society of America, vol. 112, Issue 5, Aug. 1, 2002, pp. 2053-2064.

Algazi, et al., "Elevation Localization and Head-Related Transfer Function Analysis at Low Frequencies", In Journal of the Acoustical Society of America, vol. 109, Issue 3, Mar. 2001, 14 Pages.

Algazi, et al., "Estimation of a Spherical-head Model from Anthropometry", In Journal of the Audio Engineering Society, vol. 49, Issue 6, Mar. 2, 2001, 21 Pages.

Algazi, et al., "The CIPIC HRTF Database", In Proceedings of IEEE Workshop on the Applications of Signal Processing to Audio and Acoustics, Oct. 21, 2001, pp. 99-102.

Amberg, et al., "Optimal Step Nonrigid ICP Algorithms for Surface Registration", In Proceedings of IEEE Conference on Computer Vision and Pattern Recognition, Jun. 17, 2007, 8 Pages.

Andreopoulou, Areti, "Head-Related Transfer Function Database Matching Based on Sparse Impulse Response Measurements", In Thesis Submitted in Partial Fulfillment of the Requirements of the University of New York for the Degree of Doctor of Philosophy, Jan. 2013, 239 Pages.

Bach, et al., "On Pixel-Wise Explanations for Non-Linear Classifier Decisions by Layer-Wise Relevance Propagation", In Journal of Plos One, vol. 10, Issue 7, Jul. 10, 2015, 46 Pages.

Bilinski, et al., "HRTF Magnitude Synthesis via Sparse Representation of Anthropometric Features", In Proceedings of IEEE International Conference on Acoustics, Speech and Signal Processing, May 4, 2014, 5 Pages.

Bilinski, Piotr, "HRTF Personalization using Anthropometric Features", Retrieved from: <<https://web.archive.org/web/20150921053235/http://research.microsoft.com/apps/video/dl.aspx?id=201707>>, Sep. 27, 2013, 1 Page.

Blauert, Jens, "Spatial Hearing: The Psychophysics of Human Sound Localization", In Journal of the Acoustical Society of America, vol. 77, Issue 334, Jan. 1985, pp. 334-335.

Bloom, Jeffrey P., "Creating Source Elevation Illusions by Spectral Manipulation", In Journal of Audio Engineering Society, vol. 25, Issue 9, Sep. 1, 1977, pp. 560-565.

Bomhardt, et al., "A High Resolution Head-Related Transfer Function and Three-Dimensional Ear Model Database", In Proceedings of 172 Meetings of Acoustical Society of America, vol. 29, Nov. 28, 2016, 12 Pages.

Bosun, et al., "Head-Related Transfer Function Database and its Analyses", In Proceedings of Science in China Series G: Physics, Mechanics and Astronomy, vol. 50, Issue 3, Jun. 2007, pp. 267-280.

(56) References Cited

OTHER PUBLICATIONS

Chakrabarty, et al., "Broadband DOA Estimation using Convolutional Neural Networks Trained with Noise Signals", In Proceedings of IEEE Workshop on Applications of Signal Processing to Audio and Acoustics, Oct. 15, 2017, 5 Pages.

Constan, et al., "On the Detection of Dispersion in the Head-related Transfer Function", In Journal of the Acoustical Society of America, vol. 114, Issue 2, Aug. 2003, pp. 998-1008.

Donoho, David L., "For Most Large Underdetermined Systems of Linear Equations of Minimal L1-Norm Solution is Also the Sparsest Solution", In Technical Report No. 2004-9, Jul. 2004, 30 Pages.

Duda, et al., "An Adaptable Ellipsoidal Head Model for the Interaural Time Difference", In Proceedings of IEEE International Conference on Acoustics, Speech, and Signal Processing, vol. 2, Mar. 15, 1999, 4 Pages.

Erturk, et al., "Efficient Representation of 3D Human Head Models", In Proceedings of the British Machine Vision Conference, Sep. 13, 1999, pp. 329-339.

Fink, et al., "Tuning Principal Component Weights to Individualize HRTFS", In Proceedings of IEEE International Conference on Acoustics, Speech and Signal Processing, Mar. 25, 2012, pp. 389-392.

Fliege, et al., "A Two-stage Approach for Computing Cubature Formulae for the Sphere", In Thesis of University of Dortmund, Jan. 1996, 31 Pages.

Fliege, et al., "The Distribution of Points on the Sphere and Corresponding Cubature Formulae", In Journal of IMA Numerical Analysis, vol. 19, Issue 2, Apr. 1, 1999, pp. 317-334.

Funkhouser, et al., "A Search Engine for 3D Models", In Journal of ACM Transactions on Graphics, vol. 22, Issue 1, Jan. 2003, pp. 83-105.

Gamper, et al., "Anthropometric Parameterisation of a Spherical Scatterer ITD Model with Arbitrary Ear Angles", In Proceedings of IEEE Workshop on Applications of Signal Processing to Audio and Acoustics, Oct. 18, 2015, 5 Pages.

Gamper, et al., "Estimation of Multipath Propagation Delays and Interaural Time differences from 3-D Head Scans", In Proceedings of IEEE International Conference on Acoustics, Speech and Signal Processing, Apr. 19, 2015, pp. 499-503.

Gardner, Mark B., "Some Monaural and Binaural Facets of Median Plane Localization", In Journal of the Acoustical Society of America, vol. 54, Issue 6, Dec. 1973, 8 Pages.

Gilkey, et al., "Binaural and Spatial Hearing in Real and Virtual Environments", Published by Lawrence Erlbaum Associates, Jan. 1, 1997, 24 Pages.

Grijalva, et al., "Anthropometric-based Customization of Head-related Transfer Functions Using Isomap in the Horizontal Plane", In Proceedings of IEEE International Conference on Acoustic, Speech and Signal Processing, May 4, 2014, 5 Pages.

Grindlay, et al., "A Multilinear Approach to HRTF Personalization", In Proceedings of 32nd International Conference on Acaustics, Speech, and Signal Processing, Apr. 2007, 4 Pages.

Guillon, et al., "HRTF Customization by Frequency Scaling and Rotation Shift Based on a New Morphological Matching Method", In Proceedings of 125th Convention of the Audio Engineering Society, Oct. 2, 2008, 14 Pages.

Guldenschuh, et al., "HRTF Modeling in Due Consideration Variable Torso Reflections", In Journal of the Acoustical Society of America, vol. 123, Issue 5, May 2008, 6 Pages.

Haneda, et al., "Common-acoustical-pole and Zero Modeling of Head-related Transfer Functions", In IEEE Transactions on Speech and Audio Processing, vol. 7, Issue 2, Mar. 1999, pp. 188-196.

Haraszy, et al., "Improved Head Related Transfer Function Generation and Testing for Acoustic Virtual Reality Development", In Proceedings of the 14th WSEAS International Conference on Systems: Part of the 14th WSEAS CSCC Multi Conference, vol. 2, Jul. 2010, pp. 411-416.

Wagner, et al., "Towards a Practical Face Recognition System: Robust Alignment and Illumination by Sparse Representation", In Proceedings of IEEE Transactions on Pattern Analysis and Machine Intelligence, vol. 34, Issue 2, Feb. 2012, 15 Pages.

"Notice of Allowance Issued in U.S. Appl. No. 15/463,853", dated Nov. 26, 2018, 8 Pages.

Wahab, et al., "The Effectiveness of Chosen Partial Anthropometric Measurements in Individualizing Head-Related Transfer Functions on Median Plane", In ITB Journal of Information and Communication Technology, vol. 5, Issue 1, May 2011, pp. 35-56.

Wang, et al., "Rotational Invariance Based on Fourier Analysis in Polar and Spherical Coordinates", In Proceedings of IEEE Transactions on Pattern Analysis and Machine Intelligence, vol. 31, Issue 9, Sep. 2009, pp. 1715-1722.

Watanabe, et al., "Dataset of Head-Related Transfer Functions Measured with a Circular Loudspeaker Array", In Journal of the Acoustical Science and Technology, vol. 35, Issue 3, Mar. 1, 2014, pp. 159-165.

Wenzel, et al., "Localization Using Nonindividualized Head-Related Transfer Functions", In Journal of the Acoustical Society of America vol. 94, Issue 1, Jul. 1993, 14 Pages.

Zotkin, et al., "Rendering Localized Spatial Audio in a Virtual Auditory Space", In Journal of IEEE Transactions on Multimedia, vol. 6, Issue 4, Aug. 2004, pp. 553-564.

Wightman, et al., "Headphone Simulation of Free-Field Listening. II: Psychophysical Validation", In Journal of the Acoustical Society of America, vol. 85, Issue 2, Feb. 1989, pp. 868-878.

Woodworth, et al., "Experimental Psychology", Retrieved from: <<https://ia601901.us.archive.org/30/items/ExperimentalPsychology/Experimental%20Psychology.pdf>>, Jan. 1, 1954, 958 Pages.

Wright, et al., "Robust Face Recognition via Sparse Representation", In IEEE Transactions on Pattern Analysis and Machine Intelligence, vol. 31, Issue 2, Feb. 2009, 18 Pages.

Xu, et al., "Individualization of Head-Related Transfer Function for Three-Dimensional Virtual Auditory Display: A Review", In Proceedings of International Conference on Virtual Reality, Jul. 22, 2007, pp. 397-407.

Oord, et al., "Wavenet: A Generative Model for Raw Audio", Retrieved from: <<https://arxiv.org/pdf/1609.03499.pdf>>, Sep. 19, 2016, 15 Pages.

Zeng, et al., "A Hybrid Algorithm for Selecting HRTF Based on Similarity of Anthropometric Structures", In Journal of Sound and Vibration, vol. 329, Issue 19, Sep. 13, 2010, pp. 4093-4106.

Zolfaghari, et al., "Large Deformation Diffeomorphic Metric Mapping and Fast-Multipole Boundary Element Method Provide New insights for Binaural Acoustics", In Proceedings of IEEE International Conference on Acoustics, Speech and Signal Processing, Jan. 28, 2014, 5 Pages.

Zollhofer, et al., "Automatic Reconstruction of Personalized Avatars from 3D Face Scans", In Journal of Computer Animation and Virtual Worlds, vol. 22, Issue 2-3, Apr. 12, 2011, pp. 195-202.

Hastie, et al., "The Elements of Statistical Learning Data Mining, Inference, and Prediction", In Springer Series in Statistics, Second Edition, Sep. 15, 2009, 764 Pages.

He, et al., "On the Preprocessing and Postprocessing of HRTF Individualization Based on Sparse Representation of Anthropometric Features", In Proceedings of IEEE International Conference on Acoustic, Speech and Signal Processing, Apr. 19, 2015, 6 Pages.

Hebrank, et al., "Spectral Cues used in the Localization of Sound Sources on the Median Plane", In Journal of the Acoustic Society of America, vol. 56, Issue 6, Dec. 1974, 7 Pages.

Hertsens, Tyll, "AES Headphone Technology Conference: Head Related Transfer Function", In Proceedings of Audio Engineering Society Headphone Conference, Sep. 1, 2016, 11 Pages.

Hoerl, et al., "Ridge Regression Biased Estimation for Nonorthogonal Problems", In Journal of Technometrics, vol. 42, Issue 1, Feb. 2000, pp. 80-86.

Zotkin, et al., "HRTF Personalization Using Anthropometric Measurements", In the Proceedings of the IEEE Workshop on Applications of Signal Processing to Audio and Acoustics, Oct. 19, 2003, 4 Pages.

Hu, et al., "HRTF Personalization Based on Multiple Regression Analysis", In International Conference on Computational Intelligence and Security, vol. 2, Nov. 3, 2006, pp. 1829-1832.

(56) References Cited

OTHER PUBLICATIONS

Huang, et al., "Modeling Personalized Head-Related Impulse Response Using Support Vector Regression", In Journal of Shanghai University (English Edition), vol. 13, Issue 6, Dec. 1, 2009, pp. 428-432.

Huang, et al., "Sparse Representation for Signal Classification", In Proceedings of Twenty-First Annual Conference on Neural Information Processing Systems, Dec. 2007, 8 Pages.

Hugeng, et al., "Improved Method for Individualization of Head-Related Transfer Functions on Horizontal Plane Using Reduced Number of Anthropometric Measurements", In Journal of Telecommunications, vol. 2, Issue 2, May 27, 2010, pp. 31-41.

Huttunen, et al., "Rapid Generation of Personalized HRTFs", In 55th International Conference on Spatial Audio of Audio Engineering Society, Aug. 27, 2014, 6 Pages.

Jin, et al., "Contrasting Monaural and Interaural Spectral Cues for Human Sound Localization", In Journal of the Acoustical Society of America, vol. 115, Issue 6, Jun. 2004, 4 Pages.

Jin, et al., "Creating the Sydney York Morphological and Acoustic Recordings of Ears Database", In Proceedings IEEE Transactions on Multimedia, vol. 16, Issue 1, Jan. 2014, pp. 37-46.

Jin, et al., "Enabling Individualized Virtual Auditory Space Using Morphological Measurements", In First IEEE Pacific-Rim Conference on Multimedia, Dec. 2000, 4 Pages.

Jin, et al., "Neural System Identification Model of Human Sound Localization", In Journal of the Acoustical Society of America, vol. 108, Issue 3, Sep. 2000, 22 Pages.

Kazhdan, et al., "Rotation Invariant Spherical Harmonic Representation of 3D Shape Descriptors", In Journal of Eurographics Symposium on Geometry Processing, vol. 6, Jun. 23, 2003, pp. 156-165.

Kohavi, Ron, "A Study of Cross-Validation and Bootstrap for Accuracy Estimation and Model Selection", In Proceedings of the 14th International Joint Conference on Artificial Intelligence, vol. 2, Aug. 1995, 7 Pages.

Kuhn, George F., "Model for the Interaural Time Differences in the Azimuthal Plane", In the Journal of the Acoustical Society of America, vol. 62, Issue 1, Jul. 1977, pp. 157-167.

Kukreja, et al., "A Least Absolute Shrinkage and Selection Operator (Lasso) for Nonlinear System Identification", In IFAC Proceedings Volumes, vol. 39, Issue 1, Jan. 1, 2006, 6 Pages.

Kulkarni, et al., "Role of Spectral Detail In Sound-Source Localization", In Journal of Nature, vol. 396, Dec. 24, 1998, pp. 747-749.

Kulkarni, et al., "Sensitivity of Human Subjects to Head-Related Transfer-Function Phase Spectra", In Journal of the Acoustical Society of America, vol. 105, Issue 5, May 1999, pp. 2821-2840.

Lalwani, Mona, "3D Audio is the Secret to Hololens' Convincing Holograms", Retrieved from: <<https://www.engadget.com/2016/11/02/microsoft-exclusive-hololens-spatial-sound/>>, Feb. 11, 2016, 17 Pages.

Lapuschkin, et al., "The LRP Toolbox for Artificial Neural Networks", In Journal of Machine Learning Research, vol. 17, Issue 1, Jan. 1, 2016, 5 Pages.

Lemaire, et al., "Individualized HRTFs From Few Measurements: a Statistical Learning Approach", In Proceedings of IEEE International Joint Conference on Neural Networks, Jul. 31, 2005, 7 Pages.

Li, et al., "HRTF Personalization Modeling Based on RBF Neural Network", In Proceedings of International Conference on Acoustics, Speech and Signal Processing, May 26, 2013, pp. 3707-3710.

Luo, et al., "Gaussian Process Data Fusion for the Heterogeneous HRTF Datasets", In Proceedings of IEEE Workshop on Applications of Signal Processing to Audio and Acoustics, Oct. 20, 2013, 4 Pages.

Majdak, et al., "3-D Localization of Virtual Sound Sources: Effects of Visual Environment, Pointing Method, and Training", In Journal of Attention, Perception, and Psychophysics, vol. 72, Issue 2, Feb. 1, 2010, pp. 454-469.

McMullen, et al., "Subjective Selection of HRTFs Based on Spectral Coloration and Interaural Time Difference Cues", In Proceedings of 133rd Convention of the Audio Engineering Society, Oct. 26, 2012, 9 Pages.

Meshram, et al., "Efficient HRTF Computation Using Adaptive Rectangular Decomposition", In 55th International Conference on Spatial Audio of Audio Engineering Society, Aug. 27, 2014, 9 Pages.

Middlebrooks, John C., "Virtual Localization Improved by Scaling Nonindividualized External-Ear Transfer Functions in Frequency", In Journal of the Acoustical Society of America, vol. 106, Issue 3, Sep. 1999, 19 Pages.

Mohan, et al., "Using Computer Vision to Generate Customized Spatial Audio", In Proceedings of the International Conference on Multimedia and Expo, vol. 3, Jul. 6, 2003, 4 Pages.

Mokhtari, et al., "Computer Simulation of HRTFs for Personalization of 3D Audio", In Proceedings of Second International Symposium on Universal Communication, Dec. 15, 2008, pp. 435-440.

Montavon, et al., "Explaining Nonlinear Classification Decisions with Deep Taylor Decomposition", In Journal of Pattern Recognition, vol. 65, May 2017, pp. 211-222.

Montavon, et al., "Methods for Interpreting and Understanding Deep Neural Networks", Retrieved from; <<https://arxiv.org/pdf/1706.07979.pdf>>, Jun. 24, 2017, 14 Pages.

Pei, et al., "3D Rotation Estimation Using Discrete Spherical Harmonic Oscillator Transforms", In Proceedings of IEEE International Conference on Acoustics, Speech and Signal Processing, May 5, 2014, 20 Pages.

Pei, et al., "Discrete Spherical Harmonic Oscillator Transforms on the Cartesian Grids Using Transformation Coefficients", In Journal of IEEE Transactions on Signal Processing, vol. 61, Issue 5, Mar. 1, 2013, pp. 1149-1164.

Politis, et al., "Applications of 3D Spherical Transforms to Personalization of Head-Related Transfer Functions", In Proceedings of IEEE International Conference on Acoustics, Speech and Signal Process, Mar. 2016, pp. 306-310.

Raykar, et al., "Extracting the Frequencies of the Pinna Spectral Notches in Measured Head Related Impulse Responses", In Journal of the Acoustical Society of America, vol. 118, Issue 1, Jul. 2005, 12 Pages.

Rothbucher, et al., "Measuring Anthropometric Data for HRTF Personalization", In Sixth International Conference on Signal-Image Technology and Internet Based Systems, Dec. 15, 2010, pp. 102-106.

Satarzadeh, et al., "Physical and Filter Pinna Models Based on Anthropometry", In Proceedings of 122nd Convention of Audio Engineering Society, May 5, 2007, 21 Pages.

Schonstein, et al., "HRTF Selection for Binaural Synthesis from a Database Using Morphological Parameters", In Proceedings of 20th International Congress on Acoustics, Aug. 23, 2010, 6 Pages.

Searle, et al., "Model for Auditory Localization", In Journal of the Acoustical Society of America, vol. 60, No. 5, Nov. 1976, 13 Pages.

Shaw, et al., "Sound Pressure Generated in an External-Ear Replica and Real Human Ears by a Nearby Point Source", In Journal of the Acoustical Society of America, vol. 44, Issue 1, Jul. 1968, 11 Pages.

Spagnol, et al., "On the Relation Between Pinna Reflection Patterns and Head-Related Transfer Function Features", In Proceedings of IEEE Transactions on Audio, Speech, and Language Processing, vol. 21, Issue 3, Mar. 2013, pp. 508-520.

Sridhar, et al., "A Method for Efficiently Calculating Head-Related Transfer Functions Directly from Head Scan Point Clouds", In Proceedings of 143rd Convention of Audio Engineering Society, Oct. 18, 2017, 9 Pages.

Sunder, et al., "Individualization of Head-Related Transfer Functions in the Median Plane using Frontal Projection Headphones", In Journal of Audio Engineering Society, vol. 64, Issue 12, Dec. 27, 2016, 1 Page.

Tashev, Ivan, "Audio Challenges in Virtual and Augmented Reality Devices", In Proceedings of IEEE International Workshop on Acoustic Signal Enhancement, Sep. 15, 2016, 44 Pages.

Tashev, Ivan, "HRTF Phase Synthesis via Sparse Representation of Anthropometric Features", In Proceedings of Information Theory and Applications, Feb. 9, 2014, 5 Pages.

Thuillier, et al., "Spatial Audio Feature Discovery with Convolutional Neural Networks", In Proceedings of IEEE International Conference on Acoustics, Speech and Signal Processing, Apr. 20, 2018, 5 Pages.

(56) References Cited

OTHER PUBLICATIONS

Zotkin, et al., "Virtual Audio System Customization Using Visual Matching of Ear Parameters", In Proceedings 16th International Conference on Pattern Recognition, Aug. 11, 2002, pp. 1003-1006.

\* cited by examiner

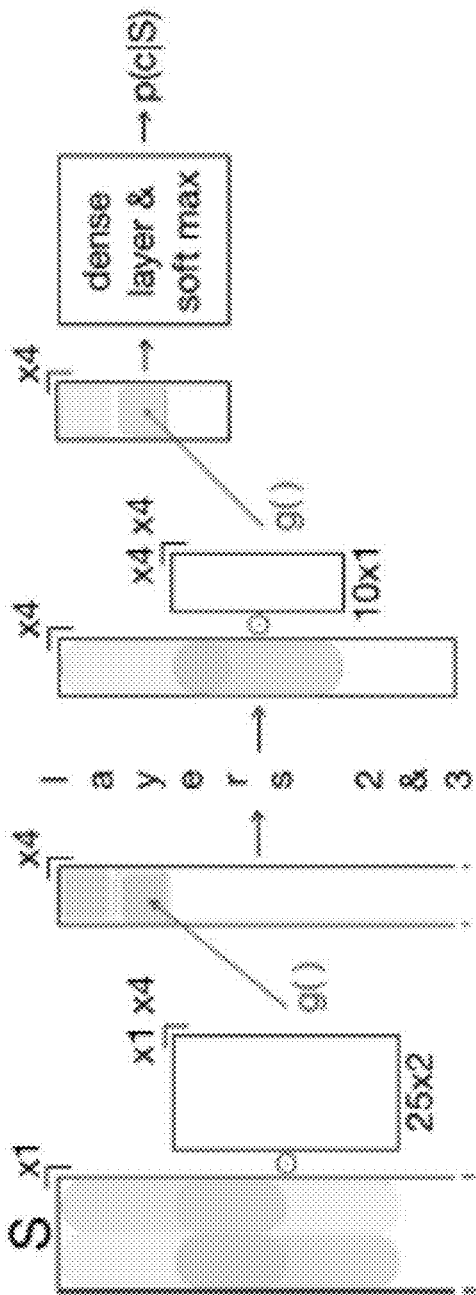
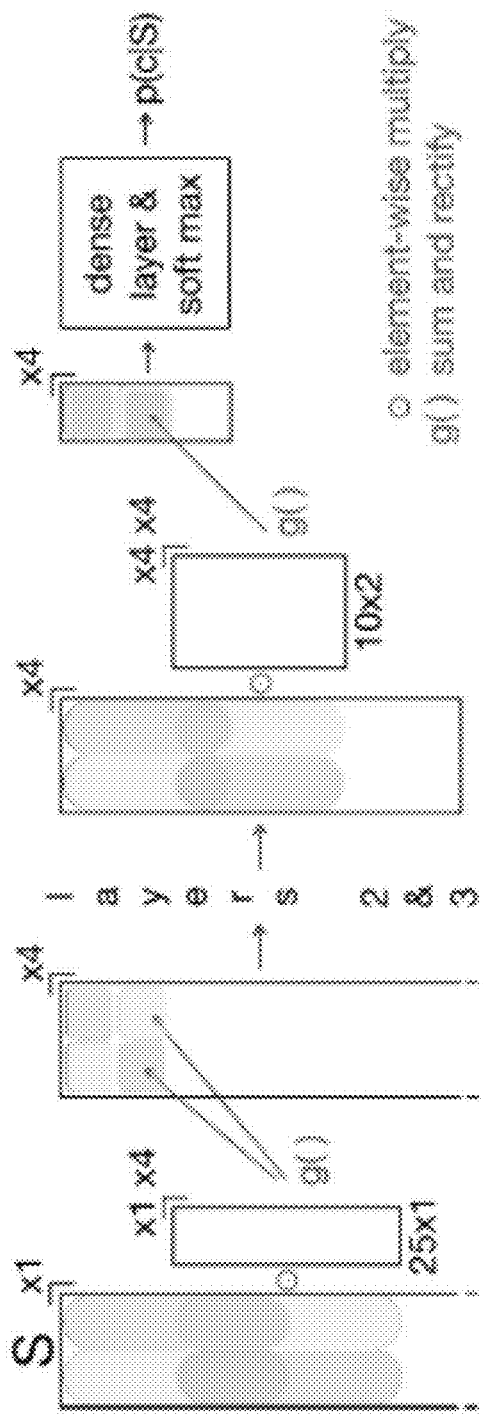
Figure 3A
Figure 3B

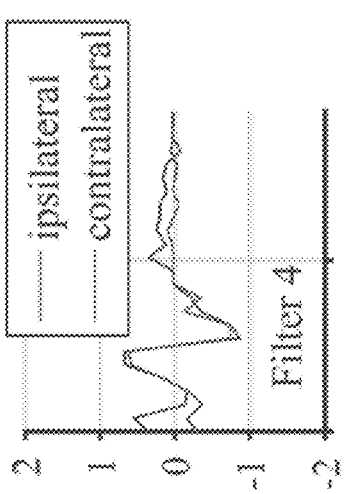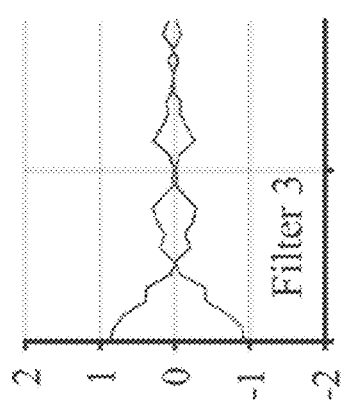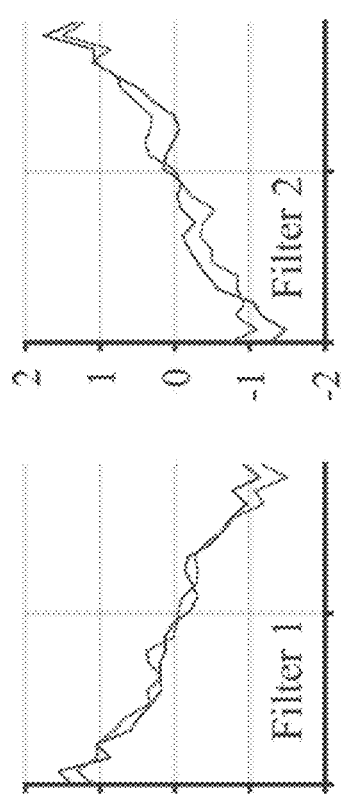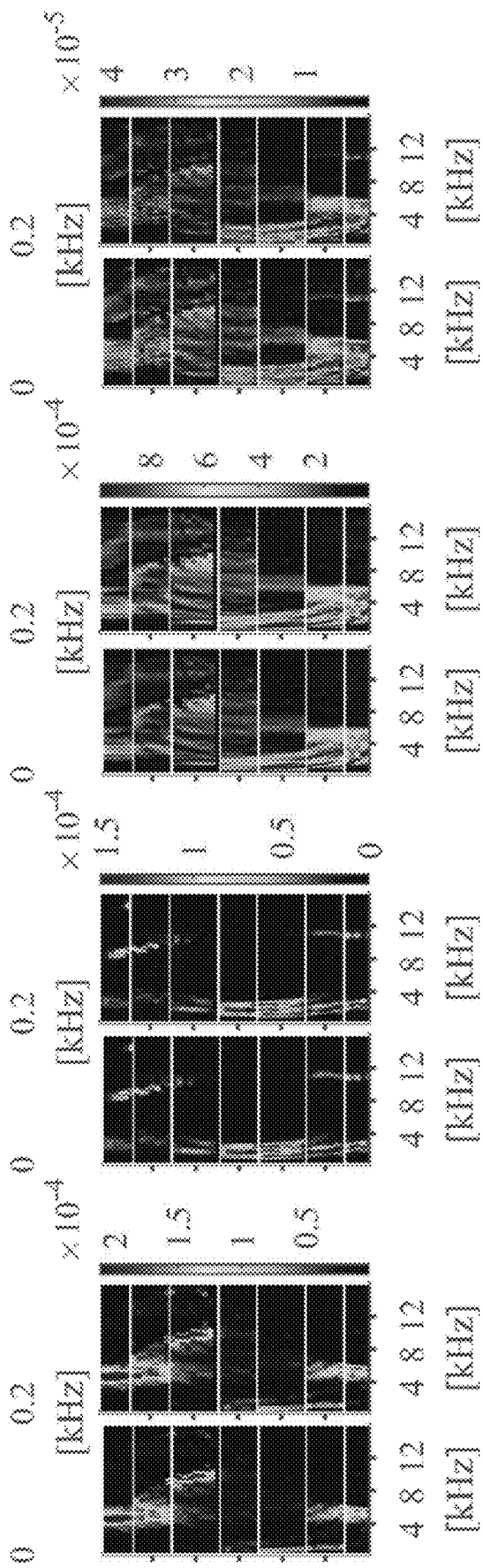
Figure 6A  Figure 6B  Figure 6C  Figure 6D
Figure 6E  Figure 6F  Figure 6G  Figure 6H

SYSTEMS, METHODS, AND COMPUTER-READABLE MEDIA FOR IMPROVED AUDIO FEATURE DISCOVERY USING A NEURAL NETWORK

TECHNICAL FIELD

The present disclosure relates to audio processing that improves audio feature discovery. Specifically, the present disclosure relates to spatial audio features discovered using machine learning, such as neural networks, to improve the perception of sound elevation.

INTRODUCTION

The advent of mixed reality consumer products, including, but not limited to virtual reality headsets and augmented reality headsets, shows that there is a need to develop and improve spatial audio rendering techniques for a broad user base. In virtual and/or augmented reality environments, the precise nature and importance of various sound localization cues and how the sound localization cues should be personalized for an individual user need improvement for local performance.

Accurate rendering of spatial sound for a large user base is an important problem. Spatial sound rendering engines may rely on acoustic models that encode filtering behavior of the human head, torso, and pinnae into sound signals to create the impression of a sound source emanating from a certain location in virtual and/or augmented reality environments. These acoustic models may be referred to as head-related impulse responses ("HRIRs") in the time domain or head-related transfer functions ("HRTFs") in the frequency domain.

When measuring the HRIRs of a user, which capture acoustic cues, the anthropometric features of the particular user are important and highly individual. As a human auditory system relies on these cues for localization, deviations from a modelled or generic HRIR set used by an audio rendering engine, may result in a degraded listening experience for another user with other anthropometric features, which result in different HRIR's for that user. Therefore, identifying the audio cues that should be preserved or modelled for accurate localization needs improvement.

While the present disclosure specifically discusses acoustical cues affecting perception of an elevation of an audio source, aspects of the present disclosure may be applicable to various other acoustic cues of spatial audio perception.

SUMMARY OF THE DISCLOSURE

According to certain embodiments, systems, methods, and computer-readable media are disclosed for improved audio feature discovery using a neural network.

According to certain embodiments, a computer-implemented method for improved audio feature discovery using a neural network is disclosed. One method including: receiving a trained neural network model, the trained neural network configured to output an audio feature classification of audio data; deconstructing the trained neural network model to generate at least one saliency map, the at least one saliency map providing a successful classification of the audio feature; and extracting at least one visualization of the audio feature the trained neural network model relies on for classification based on the at least one saliency map.

According to certain embodiments, a system for improved audio feature discovery using a neural network is disclosed. One system including: a data storage device that stores instructions for improved audio feature discovery using a neural network; and a processor configured to execute the instructions to perform a method including: receiving a trained neural network model, the trained neural network configured to output an audio feature classification of audio data; deconstructing the trained neural network model to generate at least one saliency map, the at least one saliency map providing a successful classification of the audio feature; and extracting at least one visualization of the audio feature the trained neural network model relies on for classification based on the at least one saliency map.

According to certain embodiments, a computer-readable storage device storing instructions that, when executed by a computer, cause the computer to perform a method for improved audio feature discovery using a neural network is disclosed. One method of the computer-readable storage devices including: receiving a trained neural network model, the trained neural network configured to output an audio feature classification of audio data; deconstructing the trained neural network model to generate at least one saliency map, the at least one saliency map providing a successful classification of the audio feature; and extracting at least one visualization of the audio feature the trained neural network model relies on for classification based on the at least one saliency map.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

In the course of the detailed description to follow, reference will be made to the attached drawings. The drawings show different aspects of the present disclosure and, where appropriate, reference numerals illustrating like structures, components, materials and/or elements in different figures are labeled similarly. It is understood that various combinations of the structures, components, and/or elements, other than those specifically shown, are contemplated and are within the scope of the present disclosure.

Moreover, there are many embodiments of the present disclosure described and illustrated herein. The present disclosure is neither limited to any single aspect nor embodiment thereof, nor to any combinations and/or permutations of such aspects and/or embodiments. Moreover, each of the aspects of the present disclosure, and/or embodiments thereof, may be employed alone or in combination with one or more of the other aspects of the present disclosure and/or embodiments thereof. For the sake of brevity, certain permutations and combinations are not discussed and/or illustrated separately herein.

FIGS. 3A and 3B depict exemplary schematic diagrams of neural network models, according to embodiments of the present disclosure;

FIGS. 6A-6H depict various filters of a first convolutional layer from a convolutional neural network and respective, corresponding saliency contributions, according to embodiments of the present disclosure;

Figures 1A, 1B, 1C, 1D:
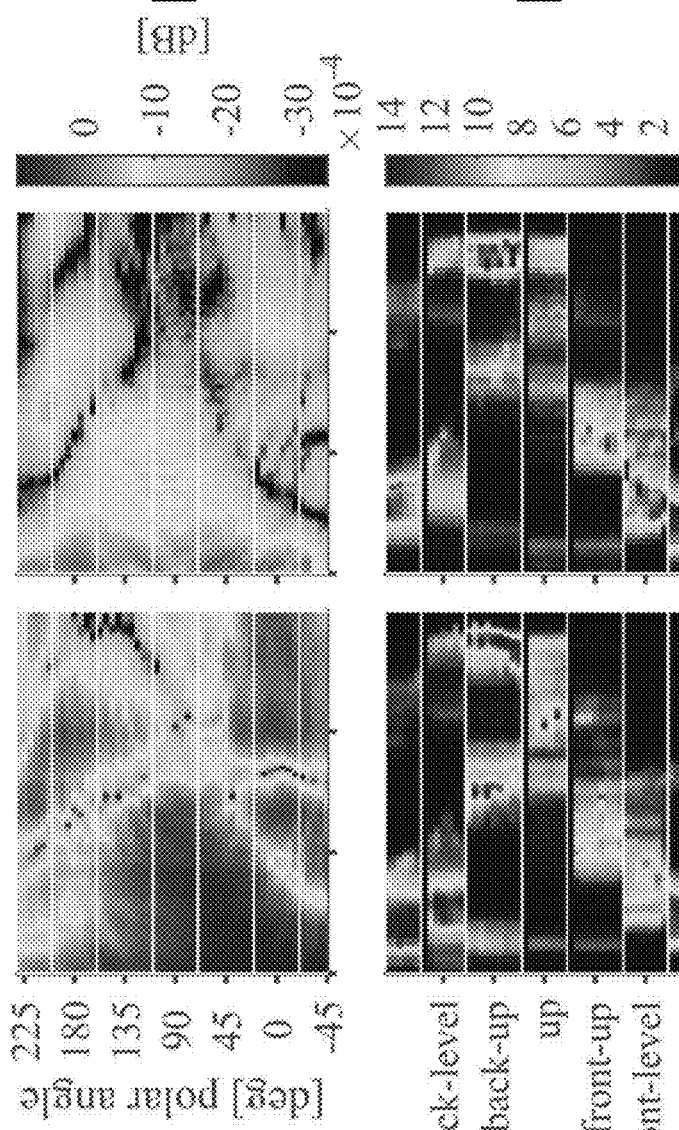
FIGS. 1A-1D depict exemplary ipsilateral and contralateral head-related transfer function magnitude responses and corresponding saliency maps of a convolutional neural network model, according to embodiments of the present disclosure.

Again, there are many embodiments described and illustrated herein. The present disclosure is neither limited to any single aspect nor embodiment thereof, nor to any combinations and/or permutations of such aspects and/or embodiments. Each of the aspects of the present disclosure, and/or embodiments thereof, may be employed alone or in combination with one or more of the other aspects of the present disclosure and/or embodiments thereof. For the sake of brevity, many of those combinations and permutations are not discussed separately herein.

DETAILED DESCRIPTION OF EMBODIMENTS

One skilled in the art will recognize that various implementations and embodiments of the present disclosure may be practiced in accordance with the specification. All of these implementations and embodiments are intended to be included within the scope of the present disclosure.

As used herein, the terms "comprises," "comprising," "have," "having," "include," "including," or any other variation thereof, are intended to cover a non-exclusive inclusion, such that a process, method, article, or apparatus that comprises a list of elements does not include only those elements, but may include other elements not expressly listed or inherent to such process, method, article, or apparatus. The term "exemplary" is used in the sense of "example," rather than "ideal." Additionally, the term "or" is intended to mean an inclusive "or" rather than an exclusive "or." That is, unless specified otherwise, or clear from the context, the phrase "X employs A or B" is intended to mean any of the natural inclusive permutations. For example, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

For the sake of brevity, conventional techniques related to systems and servers used to conduct methods and other functional aspects of the systems and servers (and the individual operating components of the systems) may not be described in detail herein. Furthermore, the connecting lines shown in the various figures contained herein are intended to represent exemplary functional relationships and/or physical couplings between the various elements. It should be noted that many alternative and/or additional functional relationships or physical connections may be present in an embodiment of the subject matter.

Reference will now be made in detail to the exemplary embodiments of the disclosure, examples of which are illustrated in the accompanying drawings. Wherever possible, the same reference numbers will be used throughout the drawings to refer to the same or like parts.

The present disclosure generally relates to, among other things, a methodology to improve spatial audio feature discovery using a convolutional neural network. There are various aspects of spatial audio perception that may be improved through the use of a neural network, as discussed herein. In particular, the present disclosure may be used to personalize generic head-related transfer functions ("HRTFs") given anthropometric features of a user. In exemplary embodiments of the present disclosure, acoustic cues affecting the perception of source elevation are focused on.

Embodiments of the present disclosure provide a machine learning approach which may be used to identify salient elevation cues encoded in the HRTFs and shared across a population of users. In particular, convolutional neural networks ("CNNs") may be used as the machine learning approach, and CNNs may provide a benefit of not needing to apply feature extraction to the raw input data. The approach of embodiments of the present disclosure may be based on training one or more CNNs to determine an elevation angle of a virtual sound source, and using layer-wise relevance propagation ("LRP") to detect one or more audio features learned by the one or more CNNs. However, other types of neural networks may also be used including, but not limited to, deep neural networks, recurrent neural network, etc.

FIGS. 1A-1D depict exemplary ipsilateral and contralateral head-related transfer function magnitude responses and corresponding saliency maps of a convolutional neural network model, according to embodiments of the present disclosure. Specifically, FIG. 1A depicts an ipsilateral HRTF magnitude response at a 30 degrees lateral angle for a subject from a dataset (i.e., subject 154 from the Center for Image Processing and Integrated Computing ("CIPIC") HRTF database, which is a public-domain database of high-spatial-resolution HRTF measurements for 45 different subjects, including the KEMAR mannequin with both small and large pinnae). FIG. 1B depicts a contralateral HRTF magnitude response at the 30 degrees lateral angle from the dataset. FIG. 1C depicts a corresponding saliency map from the ipsilateral HRTF magnitude response for a high-frequency CNN model produced via Layer-wise Relevance Propagation ("LRP"), and FIG. 1D depicts a corresponding saliency map from the contralateral HRTF magnitude response for the high-frequency CNN model produced via LRP.

The training for a CNN model may be performed on a plurality of HRTF datasets to account for variability between measured subjects and/or different measurement setups. By training the CNN model on the plurality of HRTF datasets, the CNN may learn common audio features across the datasets. As explained in more detail below, experimental results may indicate that a neural network can determine an elevation of a virtual sound source from simulated ear input signals and that the features discovered using LRP may be in line with results predicted from the psychoacoustic literature. Thus, embodiments of the present disclosure allow for a neural network framework that may be used as a tool in listening experiments for studying spatial audio features, and may, more particularly, be used as an application for HRTF personalization.

Figure 2:
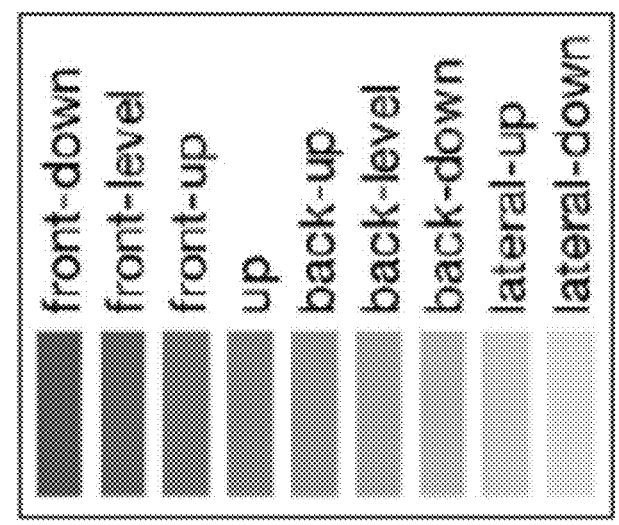
FIG. 2 depicts exemplary elevation classes in a horizontal-polar coordinate system, according to embodiments of the present disclosure.
Figure 2:
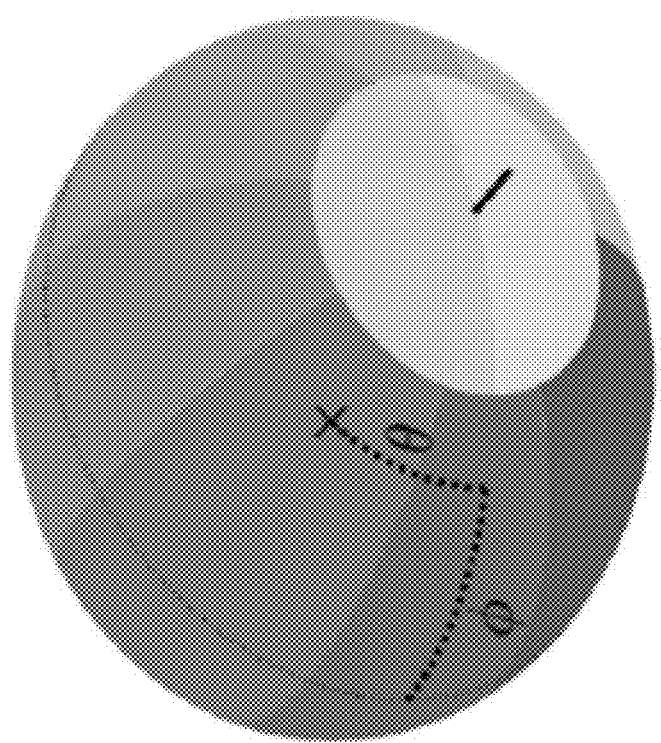

As mentioned above, embodiments of the present disclosure may be used to localize a sound source elevation using a CNN. However, more generally, the present disclosure may be used to improve various aspects of spatial audio perception through the use of a neural network. In exemplary embodiments of the present disclosure, audio features used by a convolutional neural network ("CNN") trained to perform sound source localization may be discovered. Sound source localization may be addressed as a classification problem, whereby the CNN may determine which elevation class a sound sample belongs to. FIG. 2 depicts exemplary elevation classes in a horizontal-polar coordinate system, according to embodiments of the present disclosure. However, other coordinate systems may be used to classify elevation and/or other spatial audio cues. For example, elevation classes may include one or more of front-down, front-level, front-up, up, back-up, back-level, back-down, lateral-up, and/or lateral-down. Further, FIG. 2 shows the boundaries of the nine elevation classes, given in horizontal-polar coordinates as ±60 degrees lateral angle φ and polar angles θ ranging from −90 to 270 degrees. Elevation may be viewed as an angle off a horizontal plane from the center of the coordinate system. A polar angle may be viewed as an angle of rotation about an interaural axis (i.e., an axis connecting the left ear and the right ear). A difference between elevation and polar angles may be that elevation may range from −90 to 90 degrees, while the polar angle may range from −180 to 180 degrees.

Further, embodiments of the present disclosure may be used to treat a regression problem instead of a classification problem. By treating sound source localization as a regression, similar and/or better results may be achieved compared to addressing sound source localization as a classification problem. Accordingly, a neural network may be fed raw elevation (or a polar angle) values (rather than classes). Then, the neural network may be trained to directly output an elevation (or polar angle) value by using, for example, a single output neuron with linear activation.

In exemplary embodiments of the present disclosure, the CNN may learn audio features specific to each elevation class of a horizontal-polar coordinate system. Thus, the CNN may perform the classification. In order to train a CNN, the CNN may receive, as input data, ear input signals a listener would perceive given a point-source in a far field in anechoic conditions. Anechoic conditions may be defined as free from echoes and/or reverberation, and an ideal location for anechoic conditions would include no reflections from walls, ceilings, and/or floors. Thus, the CNN may receive a left ear input signal and a right ear input signal that a listener would perceived from an audio source in an anechoic chamber.

If a neural network is trained to treat a regression problem, the CNN may learn an intrinsic relationship between a certain polar angle and audio features that manifest in input data. In other words, the CNN may explain observed data, which may lead to similar and/or better results (in terms of a polar angle estimation error and/or how well a trained neural network model generalizes).

For exemplary embodiments of the present disclosure, input audio data may include a log-magnitude spectrum of an ipsilateral ear input signal, $E_{dB,ipsi}$. $E_{dB,ipsi}$ may be given as the following formula:

$$E_{dB,ipsi} = 20\log_{10}|\mathcal{F}(gn*h_{ipsi})| \quad (1)$$

n may be a time-domain source signal. g may be a gain factor. $h_{ipsi}$ may be an ipsilateral HRIR corresponding to an audio source position. $\mathcal{F}$ may denote a Fourier transform. * may denote a convolution operator.

For exemplary embodiments of the present disclosure, input audio data may also include a log-magnitude spectrum of the contralateral ear input signal, $E_{dB,contra}$. $E_{dB,contra}$ may be obtained analogously using a contralateral HRIR $k_{contra}$. $E_{dB,contra}$ may be given as the following formula:

$$E_{dB,contra} = 20\log_{10}|\mathcal{F}(gn*h_{contra})| \quad (2)$$

n may be a time-domain source signal. g may be a gain factor. $h_{contra}$ may be a contralateral HRIR corresponding to the audio source position. $\mathcal{F}$ may denote a Fourier transform. * may denote a convolution operator.

Accordingly, a CNN training sample dataset S may be given as a K×2 matrix, as shown below $$S = [E_{dB,ipsi}, E_{dB,contra}] \quad (3)$$

Where K may be the number of frequency bins for the audio data. Each training sample may be obtained via formula (1) using a random length white noise burst, such as a random 50 milliseconds long white noise burst, as a source signal n and a pair of HRIRs randomly drawn from an elevation class of the plurality of elevation classes, such as those shown in FIG. 2. A probability of drawing a specific HRIR pair may be determined such that it ensures balancing of all test subjects and classes as well as a uniform spatial representation on a sphere.

In embodiments of the present disclosure, convolutional neural networks may be implemented. Of course, a person of ordinary skill in the art may implement embodiments of the present disclosure with other types of neural network architectures. FIGS. 3A and 3B depict exemplary schematic diagrams of neural network models, according to embodiments of the present disclosure. As shown in FIGS. 3A and 3B, two CNN architectures may be implemented, one CNN architecture may be used for wide-band ("WB") input features, such as in a range 0.3 kHz to 16 kHz, plus or minus 15%, and the other CNN architecture may be used one for high-frequency (high pass, "HP") input features in the range 4 kHz to 16 kHz, plus or minus 15%. In particular, FIG. 3A depicts a schematic diagram of a convolutional neural network model for WB input features, and FIG. 3B depicts a schematic diagram of a convolutional neural network model for HP input features. For simplicity, FIGS. 3A and 3B show only the first and fourth convolutional layers.

As shown in FIG. 3A, for the WB CNN model, output features of a first convolution layer may be generated by (two-dimensional) interaural filters, each interaural filter combining the ipsilateral and contralateral components of the input audio features, as interaural spectral differences may contribute to the perception of elevation.

The HP CNN model may be trained with input features truncated below 4 kHz, which may force the HP CNN model to learn monaural elevation cues associated with the pinna, as discussed in more detail below. In contrast to WB CNN model, for the HP CNN model, each of the lower convolution layers extracts monaural features using (single-dimensional) monaural filters, which may be applied to both the ipsilateral and contralateral sides. As shown in FIG. 3B, the resulting high-level monaural features from both sides may be combined at the top-most convolutional layer. Both the HP CNN model and the WB CNN model may comprise four convolutional layers with rectified linear units ("ReLUs"). Filter lengths and strides along a frequency dimension may be identical across these models. Specifically, a stride of two samples may be used without pooling. Each CNN model may further comprise at least one fully-connected hidden layer and a softmax output layer. A summary of the model parameters is provided in Table 1 below. In particular, Table 1 shows filter shapes (×4 per layer) and a number of trainable parameters of each CNN model.

The convolutional neural network may be trained to not over fit, as both weight decay and dropout may hurt the final performance. Deeper convolutional neural networks may be used with more layers of fully-connected layers. The convolutional neural network model may be constructed to include a plurality of neurons, and may be configured to output a spatial audio feature of audio data, such as an elevation class of the plurality of elevation classes. In an embodiment where a neural network is addressing a regression problem, the neural network may be configured to output an estimated elevation class. The plurality of neurons may be arranged in a plurality of layers, including at least one hidden layer, and may be connected by a plurality of connections.

$$R_i = \sum_j \frac{w_{ij}^2}{\sum_i w_{ij}^2} R_j \qquad (5)$$

Formula (5) may be decomposed in terms of the contributions specific to each filter of the CNN model's first layer, which may allow study of their respective saliency maps.

In exemplary embodiments of the present disclosure, experiments may be carried out using a pool of a plurality of databases, such as five HRTF databases listed in Table 2 below. Table 2 depicts curated HRTF databases that may be used for training a CNN model, according to embodiments of the present disclosure.

TABLE 2

|  | Year | Number of Subjects | Number of Measurements | Number of Pairs |
| --- | --- | --- | --- | --- |
| ARI | 2010 | 135 | 1150 | 138,000 |
| CIPIC | 2001 | 45 | 1,250 | 56,250 |
| ITA | 2016 | 46 | 2,304 | 110,592 |
| Microsoft | 2015 | 252 | 400 | 100,800 |
| RIEC | 2014 | 105 | 865 | 90,825 |

The Acoustics Research Institute ("ARI") database includes high-resolution HRTFs of about 150 subjects, with most subjects measured using in-the-ear microphones, a few

TABLE 1

|  | Convolution 1 | Convolution 2 | Convolution 3 | Convolution 4 | Number of Parameters |
| --- | --- | --- | --- | --- | --- |
| WB CNN Model | 25 × 2 | 11 × 1 | 11 × 1 | 10 × 1 | 2681 |
| HP CNN Model | 25 × 1 | 11 × 1 | 11 × 1 | 10 × 2 | 2741 |

In order to explain classification decisions of a CNN, Deep Taylor Decomposition ("DTD") may be performed. DTD is a variant of Layer-wise Relevance Propagation ("LRP"). DTD may perform a weighted redistribution of the neural network's output activation for the elected class, i.e., its relevance R, from neural network output and backwards, layer-by-layer, to the neural network input. LRP may generate a saliency map that identifies regions of an input space used by the CNN model to arrive at the classification decision. The identified regions may be formulated in terms of frequency range and binaural channel.

The relevance $R_i$ of the ith neuron in a lower layer may be given as the following:

$$R_i = \sum_j \frac{a_i w_{ij}^+}{\sum_i a_i w_{ij}^+} R_j \qquad (4)$$

Where j and $R_j$ may denote an index and a relevance of a higher-layer neuron. $w_{ij}$ may be the connection weights between the neurons. + may denote a half-wave rectification. $\alpha$ may be a (forward-pass) activation.

Given that the input features are real-valued, the following propagation rule may be applied at the CNN model's input layer.

using behind-the-ear microphones placed in hearing-aid devices. For the ARI database, 1,550 positions were measured for each listener including the full azimuthal-space (0° to 360°) and elevations from −30° to +80°. The frontal space has a resolution of 2.5° in the horizontal plane. For the ARI database, specific subjects 10 and 20 and subjects not measured using in-the-ear microphones were removed for training CNN models, according to embodiments of the present disclosure.

The CIPIC database includes HRIR for 45 subjects at 25 different azimuths and 50 different elevations (1,250 directions) at approximately 5 deg/angular increments. In addition, the CIPIC database includes anthropometric measurements for each subject.

The Institute of Technical Acoustics ("ITA") database provides HRTF datasets in a high spatial resolution with corresponding detailed ear models, reconstructed from magnetic resonance imaging ("MRI") scans, of each individual subject. The ITA-database includes 48 subjects who are on average 29±5 years old. 35 of the 48 subjects are male and 43 are Europeans, 3 are Asians, and 2 are South Americans. For all of the subjects the HRTFs datasets were measured in a semi-anechoic chamber in a resolution of 5°×5°, and MRI scans were taken of their head and pinnae. For the ITA database, specific subjects 02 and 14 were removed due to Spatially Oriented Format for Acoustics ("SOFA") metadata inconsistencies for training CNN models, according to embodiments of the present disclosure.

The Research Institute of Electrical Communication ("RIEC") database provides a HRTF dataset derived from 105 subjects (210 ears) with a number of source directions per subject ear of 865. The HRTFs were measured at 5 degrees intervals in azimuth and at 10 degrees intervals in elevation—30 to 90 degrees in spherical coordinate.

All databases, except that of Microsoft, are publicly available in SOFA. The resulting pool of databases includes approximately 0.5 million HRIR pairs from 583 subjects. The combined database may be divided into 80% for a training dataset and 20% for a test dataset. Training may be conducted using cross-entropy loss function and early stopping regularization under a tenfold cross-validation scheme. The HRIR pairs from each database may be distributed approximately uniformly across validation folds and test dataset to ensure robustness against possible database-specific artifacts. Each measured subject may be siloed into a single validation fold or the test dataset to allow performance evaluation on unseen subjects.

The input samples were generated via formula (3) using randomly generated 50 milliseconds long white noise bursts and raw HRIR data may be resampled to 32 kHz. The noise gain g in formula (1) may be randomly varied between 0 and −60 dB to provide model robustness to level variations. For the WB CNN model, frequency bins below 300 Hz may be discarded.

The resulting spectra may be weighted with an inverse of an equal-loudness-level contour at 60 phone, to approximate human hearing sensitivity. For the HP CNN model, frequency bins below 4 kHz may be discarded, which may force the HP CNN model to learn high-frequency cues. Both the HP CNN model and WB CNN model may use 1,005 frequency bins per ear.

The CNN models of embodiments of the present disclosure may be used for HRTF-based source localization, which may generalize across human subjects. The performance of the trained CNN models of embodiments of the present disclosure may be comparable to that of humans, even if achieved on a data representation that is not physiologically accurate, e.g., in terms of the spectral resolution.

As shown in FIGS. 3A and 3B, those skilled in the art will appreciate that neural networks may be conducted in regard to a model and may include phases: model creation (neural network training), model validation (neural network testing), and model utilization (neural network evaluation), though these phases may not be mutually exclusive. According to embodiments of the present disclosure, neural networks may be implemented through training, inference, and evaluation stages. Input samples generated via formula (3) may be utilized, along with corresponding ground-truth labels for neural network training and inference. For a baseline neural network, the model may have input layer of a predetermined number of neurons, at least one intermediate (hidden) layer each of another predetermined amount of neurons, and an output layer having yet another predetermined amount of neurons. The input features to the baseline CNN may be wide-band input features or high-frequency input features.

At least one server may execute a machine learning component of the audio processing system described herein. As those skilled in the art will appreciate, machine learning may be conducted in regard to a model and may include at least three phases: model creation, model validation, and model utilization, though these phases may not be mutually exclusive. As discussed in more detail below, model creation, validation, and utilization may be on-going processes of a machine learning.

For the machine learning, the model creation phase may involve extracting features from a training dataset. The machine learning component may monitor the ongoing audio data to extract features. As those skilled in the art will appreciate, these extracted features and/or other data may be derived from machine learning techniques on large quantities of data collected over time based on patterns. Based on the observations of this monitoring, the machine learning component may create a model (i.e., a set of rules or heuristics) for extracting features from audio data. The baseline neural network may be trained to, for example, minimize a classification error and/or minimize squared error between ground-truth and predicted labels.

During a second phase of machine learning, the created model may be validated for accuracy. During this phase, the machine learning component may monitor a test dataset, extract features from the test dataset, and compare those extracted features against predicted labels made by the model. Through continued tracking and comparison of this information and over a period of time, the machine learning component may determine whether the model accurately predicts an elevation of a source of the audio data. This validation is typically expressed in terms of accuracy: i.e., what percentage of the time does the model predict the correct labels. Information regarding the success or failure of the predictions by the model may be fed back to the model creation phase to improve the model and, thereby, improve the accuracy of the model.

During the inference phase, additionally data from a test dataset may be applied to the trained baseline neural network to generate the predicted labels. The predicted labels may then be compared with the ground-truth labels to compute performance metrics including mean-square error.

A third phase of machine learning may be based on a model that is validated to a predetermined threshold degree of accuracy. For example, a model that is determined to have at least a 50% accuracy rate may be suitable for the utilization phase. According to embodiments of the present disclosure, during this third, utilization phase, the machine learning component may extract features from audio data where the model suggests a classification for the elevation of a source of the audio data. Upon classifying a source location in the audio data, the model outputs the classification and may store the classification as segments of data. Of course, information based on the confirmation or rejection of the various stored segments of data may be returned back to the previous two phases (validation and creation) as data to be used to refine the model in order to increase the model's accuracy.

Classification error ("CE") rates of the WB CNN model and HP CNN model on unseen test data may be 27.19% and 45.05% respectively. Performance metrics may be derived from corresponding angular error rates after removing the lateral-up and lateral-down classes and accounting for front-back confusions. Table 3 compares the root-mean-squared error ("RMSE"), mean absolute error ("MAE"), and correlation coefficient (r) to human localization performance reported in the literature.

TABLE 3

|  | CE (in percentage) | RMSE (in Degrees) | MAE in Degrees) | r |
|---|---|---|---|---|
| Random | 91.3 | 74.5 | 59.5 | 0.65 |
| Comparison Study 1 |  | 25.2 |  | 0.85 |

TABLE 3-continued

| | CE (in percentage) | RMSE (in Degrees) | MAE in Degrees) | r |
|---|---|---|---|---|
| Comparison Study 2 | | | 22.3 | 0.82 |
| Comparison Study 3 | | | ≈25 | |
| WB CNN Model | 45.1 | 43.2 | 16.5 | 0.90 |

As can be seen from Table 3, the WB CNN model may perform comparably to human subjects.

Figures 4A, 4B:
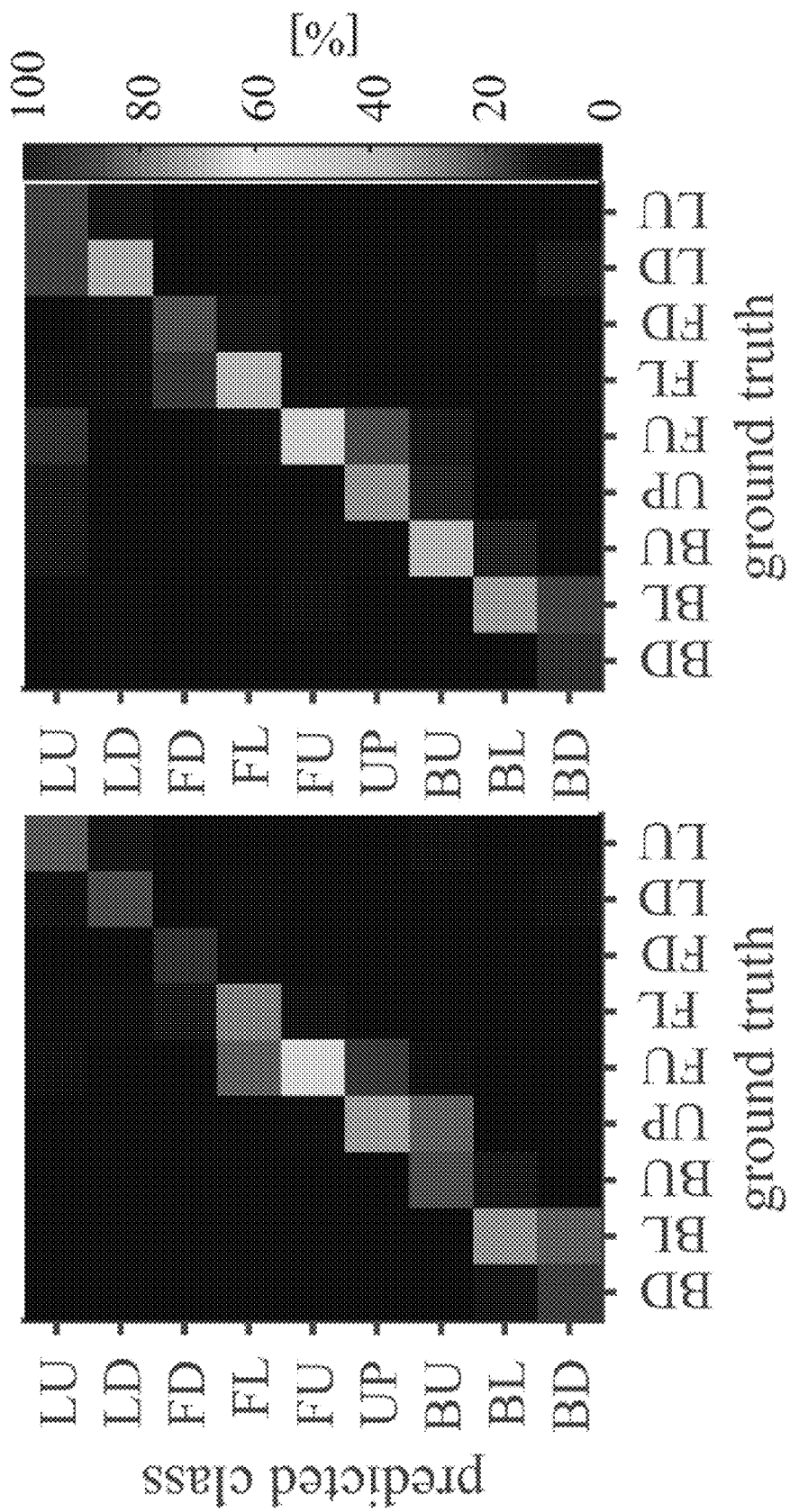
FIGS. 4A and 4B depict exemplary confusion matrices for neural network models, according to embodiments of the present disclosure.

To analyze the cues learned by the CNN model a saliency map of a specific subject may be computed. FIGS. 4A and 4B depict exemplary confusion matrices for neural network models, according to embodiments of the present disclosure. In particular, FIGS. 4A and 4B show the confusion matrices for subject 154 of the CIPIC database with FIG. 4A being from the WB CNN model and FIG. 4B being from the HP CNN model. Given the high classification performance for this subject, the HRIRs may be expected to present structures representative of the elevation cues learned by the CNN models.

Given input samples generated using randomly-drawn HRIR pairs via formula (2), 1-D saliency maps may be obtained using DTD. Then, averaging and stacking the 1-D maps of successful classifications according to their polar angle may produce the 2-D saliency map shown in FIG. 1 for the HP CNN model.

Figure 5:
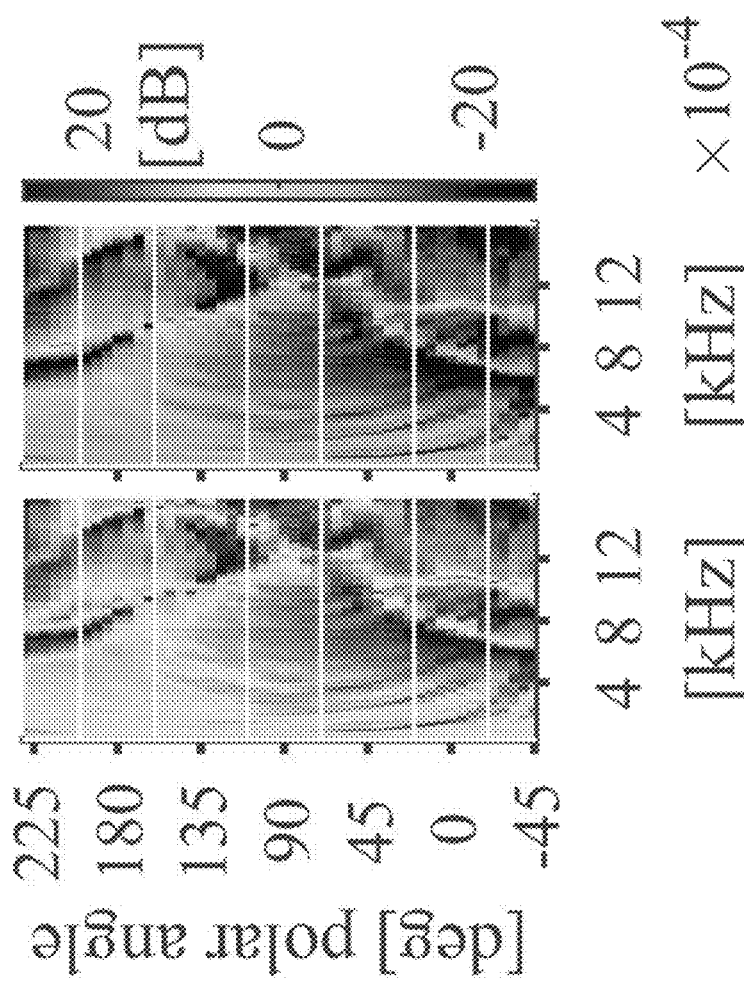
FIG. 5 depicts an exemplary interaural transfer function, according to embodiments of the present disclosure.
Figure 7:
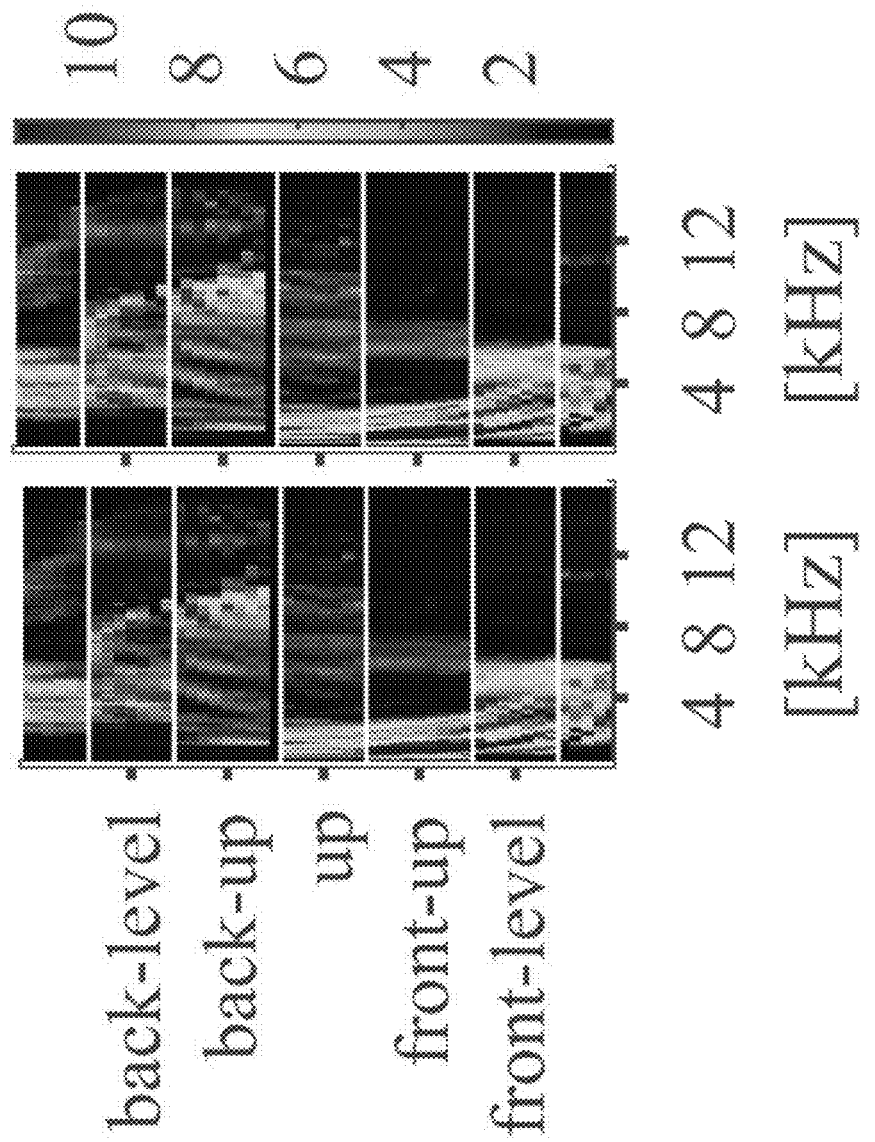
FIG. 7 depicts an exemplary combined saliency map, according to embodiments of the present disclosure.

FIG. 5 depicts an exemplary interaural transfer function, according to embodiments of the present disclosure. In particular, FIG. 5 shows an interaural transfer function at 30 degrees lateral angle for subject 154 from the CIPIC HRTF database. FIGS. 6A-6H depict various filters of a first convolutional layer from a convolutional neural network and respective, corresponding saliency contributions, according to embodiments of the present disclosure. In particular, FIGS. 6A-6D depict filters 1-4 of the first convolution layer from WB CNN model, and FIGS. 6E-6H depicts corresponding saliency contributions, respectively. FIG. 7 depicts an exemplary combined saliency map of FIGS. 6E-6H, according to embodiments of the present disclosure.

As shown in FIGS. 6A-6H, the filters of the first convolution layer in the WB CNN model may be readily interpretable. For example, filters 1 and 2 form a complementary pair of falling and rising spectral edge detectors, as shown in FIGS. 6A and 6B, and their corresponding filter-specific saliency maps are shown in FIGS. 6E and 6F, respectively. These filter-specific saliency maps may indicate that the WB CNN model uses filter 2 to extract ripples in the range from 0.3 kHz to 4 kHz caused by shoulder and torso reflections. One limitation of datasets used in training a CNN model according to embodiments of the present disclosure may be that a dependence of shoulder reflections on head orientation may not be accounted for. Thus, training a CNN model on variable shoulder reflections may potentially lower the contribution of these cues.

As shown in FIGS. 6A and 6C, filters 1 and 3 may contribute to the classification at low elevations. Filter 3, as shown in FIG. 6C, may implement interaural differentiation, and thus, may provide robust features to the upper layers of the neural network that may be invariant to changes in a frequency composition of a sound source. Interaural cues may be shown to enhance localization of sound sources in elevation. At low elevations, these might be due to torso shadowing.

Returning to FIGS. 1A-1D, it is illustrated that the HP CNN model may rely on spectral notches as a primary cue for detecting sound sources located in frontal directions (i.e., 'front-down', 'front-level' and 'front-up'). Spectral notches may vary as a function of elevation and may be identified as important localization cues for humans. As shown in FIGS. 1A-1D, the center frequency of the notch varies progressively from 6 kHz to 9 kHz, as the polar angle increases, which may be consistent with pinna models from the literature. Human pinnae may produce several spectral notches resulting from reflections off various pinna features. In the exemplary embodiment shown in FIGS. 1A-1D, the HP CNN model may rely on a lowest-frequency notch, which may stem from the largest pinna feature and which might indicate that this feature is more consistent across the population than finer pinna details.

Other features visible in FIGS. 1A-1D may include: a relatively extended low-magnitude region above 10 kHz that may be indicative of an 'up' classification; a sharp spectral notch in the 15 kHz region may be indicative of a 'back-up' classification; and a shadowing of the ipsilateral ear in the 4-7 kHz range may be indicative of a 'back-level' classification and/or a 'back-down' classification. Additional features may be determined from additional use of the CNN model.

Experimental results may indicate that a convolutional neural network ("CNN") model may be trained to achieve a classification performance comparable to that of humans in a sound localization task while being robust to inter-subject and measurement variability. The CNN model may learn features from the input data, including noise bursts convolved with measured head-related impulse responses ("HRIRs"), which may be common to the tested population. Applying Deep Taylor Decomposition ("DTD"), a variant of Layer-wise Relevance Propagation ("LRP"), to the output of the trained model and stacking the resulting saliency maps as a function of polar angle may provide an intuitive visualization of the features the CNN model relies on for classification. The features illustrated by the saliency maps, as well as the convolution filters learned by the neural network, may be in line with results from the psychoacoustic literature, which indicate that the above-described embodiments may be useful for discovering and/or verifying spatial audio features shared across a population and may open avenues for better modeling and personalization of HRIRs.

While the present disclosure specifically discusses audio processing, aspects of the present disclosure may be applicable not only to determining an elevation of a source of audio data, but may also be applicable to other audio classification problems. For example, aspects of the present disclosure may also improve classification tasks, such as source separation and microphone beam forming, as well as estimation tasks, such as acoustic echo cancellation, audio event detection, scene classification, emotion recognition, etc.

Figure 8:
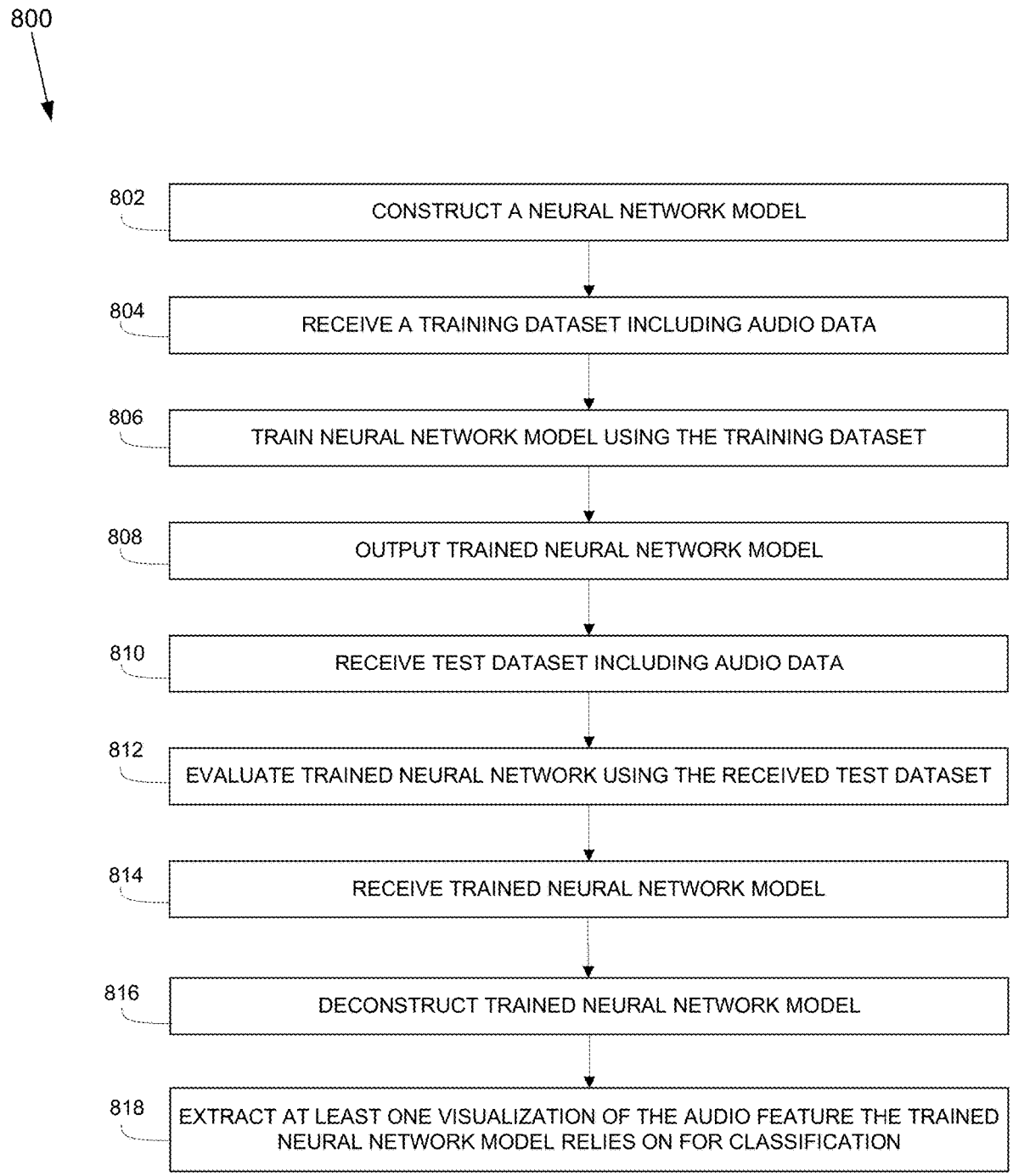
FIG. 8 depicts a method 800 improved audio feature discovery using a neural network, according to embodiments of the present disclosure.

FIG. 8 depicts a method 800 for improved audio feature discovery using a neural network, according to embodiments of the present disclosure. Method 800 may begin at step 802, in which a neural network model may be constructed and/or received according to a set of instructions. The neural network model may include a plurality of neurons. The neural network model may be configured to output a spatial audio feature classification of audio data. The plurality of neurons may be arranged in a plurality of layers, including at least one hidden layer, and may be connected by connections. Each connection including a weight. The neural network model may comprise a convolutional neural network model. Further, the neural network model may include a high pass neural network model that truncates audio data below a predetermined level. Alternatively, the neural network model may include a wide band neural network model.

For example, the neural network model may have a convolution neural network architecture that may be used for wide band input features, such as in a predetermined range, such as a range from 0.3 kHz to 16 kHz, plus or minus 15%, or the convolution neural network architecture may be used one for high pass input features in a second predetermined range, such as a range from 4 kHz to 16 kHz, plus or minus 15%.

The high pass CNN model and the wide band CNN model may comprise four convolutional layers with rectified linear units ("ReLUs"). Filter lengths and strides along a frequency dimension may be identical across these models. Each CNN model may further comprise at least one fully-connected hidden layer and a softmax output layer.

As mentioned above, the spatial audio feature may be an elevation class of a plurality of elevation classes, such as one or more of front-down, front-level, front-up, up, back-up, back-level, back-down, lateral-up, and lateral-down. However, more generally, the present disclosure may be used to improve various aspects of spatial audio perception through the use of a neural network.

Then, at step 804, a training data set may be received. The training data set may include audio data. The audio data may include ear input signals including a left ear input signal and a right ear input signal. However, embodiments of the present disclosure are not necessarily limited to audio data. The training data set may include one or more of image data, video data, textual content, genetic data, etc. Further, the received training data set may include data that has been previously scaled for precision. Additionally, and/or alternatively, the received training data set may be scaled for precision.

At step 806, the neural network model may be trained using the training data set. Then, at step 808, the trained neural network model may be outputted. The trained neural network model may be used to output predicted label for audio data. The trained deep neural network model may include the plurality of at least one-bit neurons. The trained deep neural network model configured to output a spatial audio feature classification of audio data. The plurality of the neurons may be arranged in the plurality of layers, including the at least one hidden layer, and may be connected by connections. Each connection may include a weight. In certain embodiments of the present disclosure, the neural network may comprise one of one hidden layer, two hidden layers, three hidden layers, and four hidden layers.

At step 810, a test data set may be received. Alternatively, and/or additionally, a test data set may be created. Further, embodiments of the present disclosure are not necessarily limited to audio data. For example, the test data set may include one or more of image data, video data, textual content, genetic data, etc. The received test data set may include data that has been previously scaled for precision. Additionally, and/or alternatively, the received test data set may be scaled for precision.

Then, step 812, the trained neural network may then be tested for evaluation using the test data set. Further, once evaluated to pass a predetermined threshold, the trained neural network may be utilized. Additionally, in certain embodiments of the present disclosure, the step of method 800 may be repeated to produce a plurality of trained neural networks. The plurality of trained neural networks may then be compared to each other and/or other neural networks. Alternatively, steps 810 and 812 may be omitted.

The outputted train neural network model that is configured to output an audio features, such as a spatial audio feature, classification of audio data may be received at step 814. Then, at step 816, the trained neural network model may be deconstructed to generate at least one saliency map. The at least one saliency map may provide a successful classification of the spatial audio feature. The at least one saliency map may include a plurality of one-dimensional saliency maps.

The process of deconstructing the trained neural network may include performing layer-wise relevancy propagation to produce a weight redistribution of an output activation for the spatial audio feature of the trained neural network model. Performing layer-wise relevancy propagation may, more particularly, include using a Deep Taylor Decomposition.

At step 818, the process may extract at least one visualization of the audio feature the trained neural network model relies on for classification based on the at least one saliency map. More particularly, extracting the at least one visualization of the spatial audio feature may include producing two-dimensional saliency maps by averaging and stacking the plurality of one-dimensional saliency maps. Thus, the approach of embodiments of the present disclosure may be based on training one or more CNNs to determine an elevation angle of a sound source, and using LRP, such as DTD, to detect one or more audio features learned by the one or more CNNs.

Figure 9:
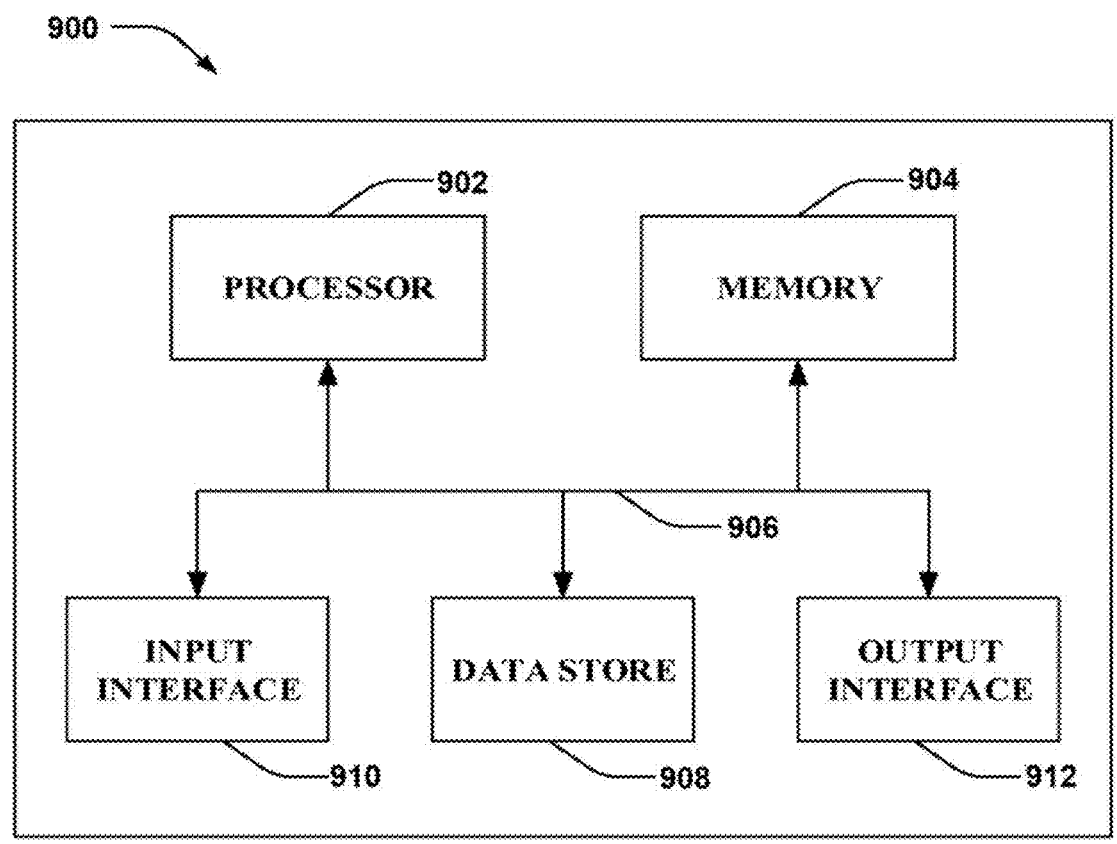
FIG. 9 depicts a high-level illustration of an exemplary computing device that may be used in accordance with the systems, methods, and computer-readable media disclosed herein, according to embodiments of the present disclosure.

FIG. 9 depicts a high-level illustration of an exemplary computing device 900 that may be used in accordance with the systems, methods, modules, and computer-readable media disclosed herein, according to embodiments of the present disclosure. For example, the computing device 900 may be used in a system that processes data, such as audio data, using a neural network, according to embodiments of the present disclosure. The computing device 900 may include at least one processor 902 that executes instructions that are stored in a memory 904. The instructions may be, for example, instructions for implementing functionality described as being carried out by one or more components discussed above or instructions for implementing one or more of the methods described above. The processor 902 may access the memory 904 by way of a system bus 906. In addition to storing executable instructions, the memory 904 may also store data, audio, one or more neural networks, and so forth.

The computing device 900 may additionally include a data store, also referred to as a database, 908 that is accessible by the processor 902 by way of the system bus 906. The data store 908 may include executable instructions, data, examples, features, etc. The computing device 900 may also include an input interface 910 that allows external devices to communicate with the computing device 900. For instance, the input interface 910 may be used to receive instructions from an external computer device, from a user, etc. The computing device 900 also may include an output interface 912 that interfaces the computing device 900 with one or more external devices. For example, the computing device 900 may display text, images, etc. by way of the output interface 912.

It is contemplated that the external devices that communicate with the computing device 900 via the input interface 910 and the output interface 912 may be included in an environment that provides substantially any type of user interface with which a user can interact. Examples of user interface types include graphical user interfaces, natural user interfaces, and so forth. For example, a graphical user interface may accept input from a user employing input device(s) such as a keyboard, mouse, remote control, or the like and may provide output on an output device such as a display. Further, a natural user interface may enable a user to interact with the computing device 900 in a manner free from constraints imposed by input device such as keyboards, mice, remote controls, and the like. Rather, a natural user interface may rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 900 may be a distributed system. Thus, for example, several devices may be in communication by way of a network connection and may collectively perform tasks described as being performed by the computing device 900.

Figure 10:
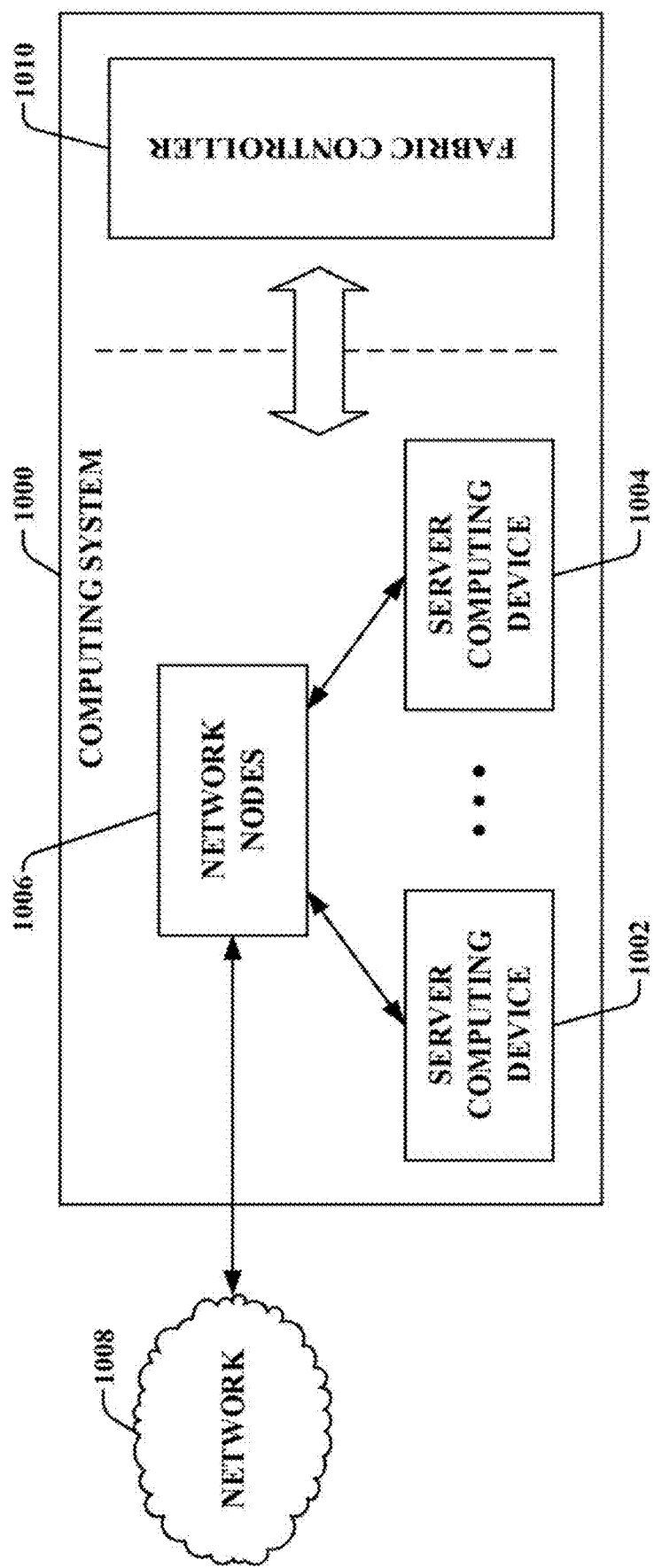
FIG. 10 depicts a high-level illustration of an exemplary computing system that may be used in accordance with the systems, methods, and computer-readable media disclosed herein, according to embodiments of the present disclosure.

Turning to FIG. 10, FIG. 10 depicts a high-level illustration of an exemplary computing system 1000 that may be used in accordance with the systems, methods, modules, and computer-readable media disclosed herein, according to embodiments of the present disclosure. For example, the computing system 1000 may be or may include the computing device 900. Additionally, and/or alternatively, the computing device 900 may be or may include the computing system 1000.

The computing system 1000 may include a plurality of server computing devices, such as a server computing device 1002 and a server computing device 1004 (collectively referred to as server computing devices 1002-1004). The server computing device 1002 may include at least one processor and a memory; the at least one processor executes instructions that are stored in the memory. The instructions may be, for example, instructions for implementing functionality described as being carried out by one or more components discussed above or instructions for implementing one or more of the methods described above. Similar to the server computing device 1002, at least a subset of the server computing devices 1002-1004 other than the server computing device 1002 each may respectively include at least one processor and a memory. Moreover, at least a subset of the server computing devices 1002-1004 may include respective data stores.

Processor(s) of one or more of the server computing devices 1002-1004 may be or may include the processor, such as processor 902. Further, a memory (or memories) of one or more of the server computing devices 1002-1004 can be or include the memory, such as memory 904. Moreover, a data store (or data stores) of one or more of the server computing devices 1002-1004 may be or may include the data store, such as data store 908.

The computing system 1000 may further include various network nodes 1006 that transport data between the server computing devices 1002-1004. Moreover, the network nodes 1006 may transport data from the server computing devices 1002-1004 to external nodes (e.g., external to the computing system 1000) by way of a network 1008. The network nodes 1002 may also transport data to the server computing devices 1002-1004 from the external nodes by way of the network 1008. The network 1008, for example, may be the Internet, a cellular network, or the like. The network nodes 1006 may include switches, routers, load balancers, and so forth.

A fabric controller 1010 of the computing system 1000 may manage hardware resources of the server computing devices 1002-1004 (e.g., processors, memories, data stores, etc. of the server computing devices 1002-1004). The fabric controller 1010 may further manage the network nodes 1006. Moreover, the fabric controller 1010 may manage creation, provisioning, de-provisioning, and supervising of managed runtime environments instantiated upon the server computing devices 1002-1004.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Various functions described herein may be implemented in hardware, software, or any combination thereof. If implemented in software, the functions may be stored on and/or transmitted over as one or more instructions or code on a computer-readable medium. Computer-readable media may include computer-readable storage media. A computer-readable storage media may be any available storage media that may be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, may include compact disc ("CD"), laser disc, optical disc, digital versatile disc ("DVD"), floppy disk, and Blu-ray disc ("BD"), where disks usually reproduce data magnetically and discs usually reproduce data optically with lasers. Further, a propagated signal is not included within the scope of computer-readable storage media. Computer-readable media may also include communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio and microwave are included in the definition of communication medium. Combinations of the above may also be included within the scope of computer-readable media.

Alternatively, and/or additionally, the functionality described herein may be performed, at least in part, by one or more hardware logic components. For example, and without limitation, illustrative types of hardware logic components that may be used include Field-Programmable Gate Arrays ("FPGAs"), Application-Specific Integrated Circuits ("ASICs"), Application-Specific Standard Products ("ASSPs"), System-on-Chips ("SOCs"), Complex Programmable Logic Devices ("CPLDs"), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims.

What is claimed is:

1. A computer-implemented method for improved audio feature discovery using a neural network, the method comprising:
   receiving a trained neural network model, the trained neural network configured to output an audio feature classification of audio data, the trained neural network model comprises a convolutional neural network model with rectified linear units ("ReLUs") and with identical filter lengths and strides along a frequency dimension, the convolution neural network architecture using wide band input features of a predetermined range from 0.3 kHz to 16 kHz;
   deconstructing the trained neural network model to generate a plurality of one-dimensional saliency maps by performing layer-wise relevancy propagation ("LRP") to produce a weight redistribution of an output activation for the audio feature of the trained neural network model, the LRP generating the plurality of one-dimensional saliency maps that identifies regions of an input space used by the trained neural network model that provides a successful classification of the audio feature;
   extracting at least one visualization of the audio feature the trained neural network model relies on for classification based on the plurality of one-dimensional saliency maps; and
   producing the two-dimensional saliency maps by averaging and stacking the plurality of one-dimensional saliency maps.

2. The method according to claim 1, wherein performing the LRP includes using a Deep Taylor Decomposition.

3. The method according to claim 1, wherein the at least one saliency map providing the successful classification of the audio feature includes the plurality of one-dimensional saliency maps.

4. The method according to claim 1, wherein producing the two-dimensional saliency maps by averaging and stacking the plurality of one-dimensional saliency maps includes averaging and stacking one-dimensional saliency maps of the plurality of one-dimensional saliency maps of successful classifications according to a polar angle.

5. The method according to claim 1, wherein the audio feature is a spatial audio feature including an elevation class of a plurality of elevation classes.

6. The method according to claim 5, wherein the plurality of elevation classes include one or more of front-down, front-level, front-up, up, back-up, back-level, back-down, lateral-up, and lateral-down.

7. The method according to claim 1, further comprising:
   constructing a neural network model, including a plurality of neurons, configured to output the audio feature classification of audio data, the plurality of neurons arranged in a plurality of layers, including at least one hidden layer, and being connected by a plurality of connections;
   receiving a training data set, the training data set including audio data;
   training the neural network model using the training data set; and
   outputting the trained neural network model configured to output the audio feature classification of audio data.

8. The method according to claim 7, wherein the audio data includes ear input signals including a left ear input signal and a right ear input signal.

9. The method according to claim 7, wherein constructing the neural network model includes constructing a wide band neural network model having a convolution neural network architecture that uses with rectified linear units ("ReLUs") and with identical filter lengths and strides along the frequency dimension, the convolution neural network architecture using wide band input features of a predetermined range from 0.3 kHz to 16 kHz.

10. The method according to claim 7, further comprising:
    receiving a test data set, the test data set including audio data; and
    evaluating the trained neural network using the received test data set.

11. A system for improved audio feature discovery using a neural network, the system including:
    a data storage device that stores instructions for improved audio feature discovery using a neural network; and
    a processor configured to execute the instructions to perform a method including:
      receiving a trained neural network model, the trained neural network configured to output an audio feature classification of audio data, the trained neural network model comprises a convolutional neural network model with rectified linear units ("ReLUs") and with identical filter lengths and strides along a frequency dimension, the convolution neural network architecture using wide band input features of a predetermined range from 0.3 kHz to 16 kHz;
      deconstructing the trained neural network model to generate a plurality of one-dimensional saliency maps by performing layer-wise relevancy propagation ("LRP") to produce a weight redistribution of an output activation for the audio feature of the trained neural network model, the LRP generating the plurality of one-dimensional saliency maps that identifies regions of an input space used by the trained neural network model that provides a successful classification of the audio feature;
      extracting at least one visualization of the audio feature the trained neural network model relies on for classification based on the plurality of one-dimensional saliency maps; and
      producing the two-dimensional saliency maps by averaging and stacking the plurality of one-dimensional saliency maps.

12. The system according to claim 11, wherein performing the LRP includes using a Deep Taylor Decomposition.

13. The system according to claim 11, wherein the processor is further configured to execute the instructions to perform the method including:
    constructing a neural network model, including a plurality of neurons, configured to output the audio feature classification of audio data, the plurality of neurons arranged in a plurality of layers, including at least one hidden layer, and being connected by a plurality of connections;
    receiving a training data set, the training data set including audio data;
    training the neural network model using the training data set; and
    outputting the trained neural network model configured to output the audio feature classification of audio data.

14. A computer-readable storage device storing instructions that, when executed by a computer, cause the computer to perform a method for improved audio feature discovery using a neural network, the method including:
    receiving a trained neural network model, the trained neural network configured to output an audio feature classification of audio data, the trained neural network model comprises a convolutional neural network model with rectified linear units ("ReLUs") and with identical filter lengths and strides along a frequency dimension, the convolution neural network architecture using wide band input features of a predetermined range from 0.3 kHz to 16 kHz;

deconstructing the trained neural network model to generate a plurality of one-dimensional saliency maps by performing layer-wise relevancy propagation ("LRP") to produce a weight redistribution of an output activation for the audio feature of the trained neural network model, the LRP generating the plurality of one-dimensional saliency maps that identifies regions of an input space used by the trained neural network model that provides a successful classification of the audio feature;

extracting at least one visualization of the audio feature the trained neural network model relies on for classification based on the plurality of one-dimensional saliency maps; and producing the two-dimensional saliency maps by averaging and stacking the plurality of one-dimensional saliency maps.

15. The computer-readable storage device according to claim 14, wherein performing the LRP includes using a Deep Taylor Decomposition.

16. The computer-readable storage device according to claim 14, wherein the method further includes:

constructing a neural network model, including a plurality of neurons, configured to output the audio feature classification of audio data, the plurality of neurons arranged in a plurality of layers, including at least one hidden layer, and being connected by a plurality of connections;

receiving a training data set, the training data set including audio data;

training the neural network model using the training data set; and outputting the trained neural network model configured to output the audio feature classification of audio data.

17. The method according to claim 1, wherein the identified regions are formulated in terms of frequency range and binaural channel.

18. The system according to claim 11, wherein the identified regions are formulated in terms of frequency range and binaural channel.

19. The computer-readable storage device according to claim 14, wherein the identified regions are formulated in terms of frequency range and binaural channel.

20. The method according to claim 7, wherein the convolution neural network architecture further comprising at least one fully-connected hidden layer and a softmax output layer.

* * * * *